United States Patent
Earl et al.

(10) Patent No.: US 10,331,525 B2
(45) Date of Patent: *Jun. 25, 2019

(54) CLUSTER FILE SERVER PROXY SERVER FOR BACKUP AND RECOVERY

(71) Applicant: EMC IP Holding Company LLC, Hopkinton, MA (US)

(72) Inventors: Min-Chih Lu Earl, Redmond, WA (US); Koteswara R. Boda, Redmond, WA (US); Jerzy Gruszka, Bellevue, WA (US); Matthew D. Buchman, Seattle, WA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/919,039

(22) Filed: Oct. 21, 2015

(65) Prior Publication Data
US 2016/0110267 A1  Apr. 21, 2016

Related U.S. Application Data

(63) Continuation of application No. 13/631,231, filed on Sep. 28, 2012, now Pat. No. 9,201,887.

(60) Provisional application No. 61/618,103, filed on Mar. 30, 2012.

(51) Int. Cl.
*G06F 11/14* (2006.01)
*G06F 16/11* (2019.01)
*G06F 16/188* (2019.01)

(52) U.S. Cl.
CPC ...... *G06F 11/1469* (2013.01); *G06F 11/1451* (2013.01); *G06F 11/1464* (2013.01); *G06F 16/128* (2019.01); *G06F 16/188* (2019.01); *G06F 2201/84* (2013.01)

(58) Field of Classification Search
USPC ........ 707/639, 640, 648, 649, 679, 682, 831
See application file for complete search history.

(56) References Cited

U.S. PATENT DOCUMENTS

| | | | | |
|---|---|---|---|---|
| 6,665,815 B1 * | 12/2003 | Goldstein | ........... | G06F 11/1451 714/20 |
| 7,296,125 B2 * | 11/2007 | Ohran | ................. | G06F 11/1451 707/999.202 |
| 7,584,339 B1 * | 9/2009 | Bingham | ............ | G06F 11/1464 711/161 |
| 7,587,565 B1 * | 9/2009 | Bingham | ............ | G06F 11/1464 711/161 |
| 7,707,304 B1 * | 4/2010 | Lolayekar | ............... | H04L 47/10 709/232 |
| 7,725,669 B1 * | 5/2010 | Bingham | ............ | G06F 11/1464 711/161 |

(Continued)

OTHER PUBLICATIONS

Microsoft TechNet, Configure a Virtual Machine for High Availability, May 22, 2009, https://technet.microsoft.com.

(Continued)

*Primary Examiner* — Cam Linh T Nguyen
(74) *Attorney, Agent, or Firm* — Van Pelt, Yi & James LLP

(57) ABSTRACT

A remote snapshot is taken of a data associated with a node within a cluster of nodes by using a snapshot facility of an operating system. A set of backup data components is recorded. The data is remotely restored by interpreting the remote snapshot with the set of backup data components.

20 Claims, 20 Drawing Sheets

(56) References Cited

U.S. PATENT DOCUMENTS

| | | | | |
|---|---|---|---|---|
| 7,730,033 | B2* | 6/2010 | Mohamed | G06F 17/30067 707/649 |
| 7,864,758 | B1* | 1/2011 | Lolayekar | H04L 67/1097 370/229 |
| 7,971,094 | B1* | 6/2011 | Benn | G06F 11/2025 714/11 |
| 8,001,085 | B1* | 8/2011 | Kiselev | G06F 11/2071 707/639 |
| 8,024,292 | B2* | 9/2011 | Thompson | G06F 11/1466 707/640 |
| 8,204,860 | B1* | 6/2012 | Ferguson | G06F 17/30088 707/639 |
| 8,219,769 | B1* | 7/2012 | Wilk | G06F 11/1464 707/640 |
| 8,266,402 | B2* | 9/2012 | Garimella | G06F 11/1435 711/162 |
| 8,429,649 | B1* | 4/2013 | Feathergill | G06F 9/45558 718/1 |
| 8,473,463 | B1* | 6/2013 | Wilk | G06F 11/1453 707/647 |
| 8,484,163 | B1* | 7/2013 | Yucel | G06F 17/30289 370/216 |
| 8,495,304 | B1* | 7/2013 | Natanzon | G06F 11/1453 711/133 |
| 8,495,317 | B2* | 7/2013 | Chandra | G06F 11/1466 711/162 |
| 2003/0093567 | A1* | 5/2003 | Lolayekar | H04L 67/1097 709/246 |
| 2003/0131278 | A1* | 7/2003 | Fujibayashi | G06F 11/1469 714/6.3 |
| 2005/0114464 | A1* | 5/2005 | Amir | H04L 67/1097 709/213 |
| 2005/0193245 | A1* | 9/2005 | Hayden | G06F 11/2069 714/13 |
| 2005/0246575 | A1* | 11/2005 | Chen | G06F 11/2069 714/6.12 |
| 2006/0195493 | A1* | 8/2006 | Chang | G06F 11/1466 |
| 2007/0260579 | A1* | 11/2007 | Bae | G06F 17/30463 |
| 2008/0008090 | A1* | 1/2008 | Gilfix | H04L 12/5695 370/230 |
| 2008/0222373 | A1* | 9/2008 | Garimella | G06F 11/1435 711/161 |
| 2008/0307175 | A1* | 12/2008 | Hart | G06F 11/1461 711/162 |
| 2008/0320219 | A1* | 12/2008 | Okada | G06F 11/2074 711/114 |
| 2009/0006619 | A1* | 1/2009 | Mohammed | G06F 11/1458 709/225 |
| 2009/0024813 | A1* | 1/2009 | Uysal | G06F 11/1471 711/162 |
| 2009/0043873 | A1* | 2/2009 | Barsness | G06F 11/1438 709/223 |
| 2009/0106255 | A1* | 4/2009 | Lacapra | G06F 11/1076 |
| 2009/0228488 | A1* | 9/2009 | Brand | G06F 11/1464 |
| 2009/0249284 | A1* | 10/2009 | Antosz | G06F 8/10 717/104 |
| 2009/0313389 | A1* | 12/2009 | McCabe | G06F 3/0626 709/253 |
| 2009/0313447 | A1* | 12/2009 | Nguyen | G06F 11/1451 711/162 |
| 2010/0011178 | A1* | 1/2010 | Feathergill | G06F 11/1466 711/162 |
| 2010/0030983 | A1* | 2/2010 | Gupta | G06F 11/1466 711/162 |
| 2010/0057789 | A1* | 3/2010 | Kawaguchi | G06F 11/1456 707/E17.005 |
| 2010/0070725 | A1* | 3/2010 | Prahlad | G06F 11/1453 711/162 |
| 2010/0114889 | A1* | 5/2010 | Rabii | G06F 17/30197 707/737 |
| 2012/0079221 | A1* | 3/2012 | Sivasubramanian | G06F 11/1456 711/162 |
| 2012/0084713 | A1* | 4/2012 | Desai | G06F 3/0481 715/788 |
| 2012/0158662 | A1* | 6/2012 | Buragohain | G06F 11/1461 707/649 |
| 2012/0203742 | A1* | 8/2012 | Goodman | G06F 11/1451 707/646 |
| 2012/0259961 | A1* | 10/2012 | Winokur | G06F 3/0619 709/223 |
| 2012/0330903 | A1* | 12/2012 | Periyagaram | G06F 3/0608 707/692 |
| 2013/0054533 | A1 | 2/2013 | Hao et al. | |
| 2013/0166863 | A1* | 6/2013 | Buragohain | G06F 11/1446 711/162 |
| 2013/0336104 | A1* | 12/2013 | Talla | H04L 45/245 370/216 |
| 2014/0006355 | A1* | 1/2014 | Kirihata | G06F 17/30233 707/654 |
| 2014/0082167 | A1* | 3/2014 | Robinson | G06F 11/1458 709/223 |

OTHER PUBLICATIONS

Microsoft TechNet, Volume Shadow Copy Service, Nov. 8, 2017, https://technet.microsoft.com.

Microsoft TechNet, Windows Management Instrumentation (WMI), Nov. 8, 2017, https://technet.microsoft.com.

William Stanek, Windows Server 2012 Pocket Consultant, Sep. 15, 2012.

* cited by examiner

FIG. 18

Select for Backup | Select for Restore

By Date | By File/Folder

Backup History
Backup(s) for month — ◄February►
◄2012►

| Sun | Mon | Tue | Wed | Thu | Fri | Sat |
|---|---|---|---|---|---|---|
| 29 | 30 | 31 | 1 | 2 | 3 | 4 |
| 5 | 6 | 7 | 8 | 9 | 10 | 11 |
| 12 | 13 | 14 | 15 | 16 | 17 | (18) |
| 19 | 20 | 21 | (22) | (23) | 24 | 25 |
| 26 | 27 | 28 | 29 | 1 | 2 | 3 |
| 4 | 5 | 6 | 7 | 8 | 9 | 10 |

Backups for February 23

| Number | Name | Time (PST) | Plug-In | ********** | Size |
|---|---|---|---|---|---|
| 24 | MOD-1330048344385OO | 17:52:54 | Windows Hyper-V VSS | N | 4,222,572 |

Contents of Backup named MOD-1330048344385OO

- □
  - ⊞ Av-App-FS1
  - ⊞ Av-App-FS2
  - ⊞ Av-Gen-FS1

New Virtual Machines

| Select | | Name | | | Cluster Shared Volumes Default Share |
|---|---|---|---|---|---|
| | Accounting | c:\ClusterStorage\Volume2... | smb | No | |
| | ClusterStorage | c:\ClusterStorage | smb | No | |
| | Engineering | c:\ClusterStorage\Volume2... | smb | Yes | |
| | Marketing | c:\ClusterStorage\Volume2... | smb | Yes | |

CLUSTER FILE SERVER PROXY SERVER FOR BACKUP AND RECOVERY

CROSS REFERENCE TO OTHER APPLICATIONS

This application is a continuation of co-pending U.S. patent application Ser. No. 13/631,231, entitled CLUSTER FILE SERVER PROXY SERVER FOR BACKUP AND RECOVERY, filed Sep. 28, 2012, which claims priority to U.S. Provisional Patent Application No. 61/618,103, entitled VIRTUAL MACHINE PROXY SERVER FOR HYPER-V IMAGE BACKUP AND RECOVERY, filed Mar. 30, 2012, both of which are incorporated herein by reference for all purposes.

BACKGROUND OF THE INVENTION

Backup and recovery in an environment of clustered nodes is a critical function. Recent operating systems, for example Microsoft Windows Server 2012, provide a function for a local node not only to backup data at the local node, but also to backup data from a remote node. Such data might include a file share or a virtual machine ("VM") image. These operating systems that provide a function for a local node to backup data at either the local node or a remote node is a convenient capability as it does not require backup software to be installed at both or every node.

BRIEF DESCRIPTION OF THE DRAWINGS

Various embodiments of the invention are disclosed in the following detailed description and the accompanying drawings.

FIG. 18 displays an example user interface window for the Cluster File Server Proxy Plug-in recovery operations.

DETAILED DESCRIPTION

Figure 1:
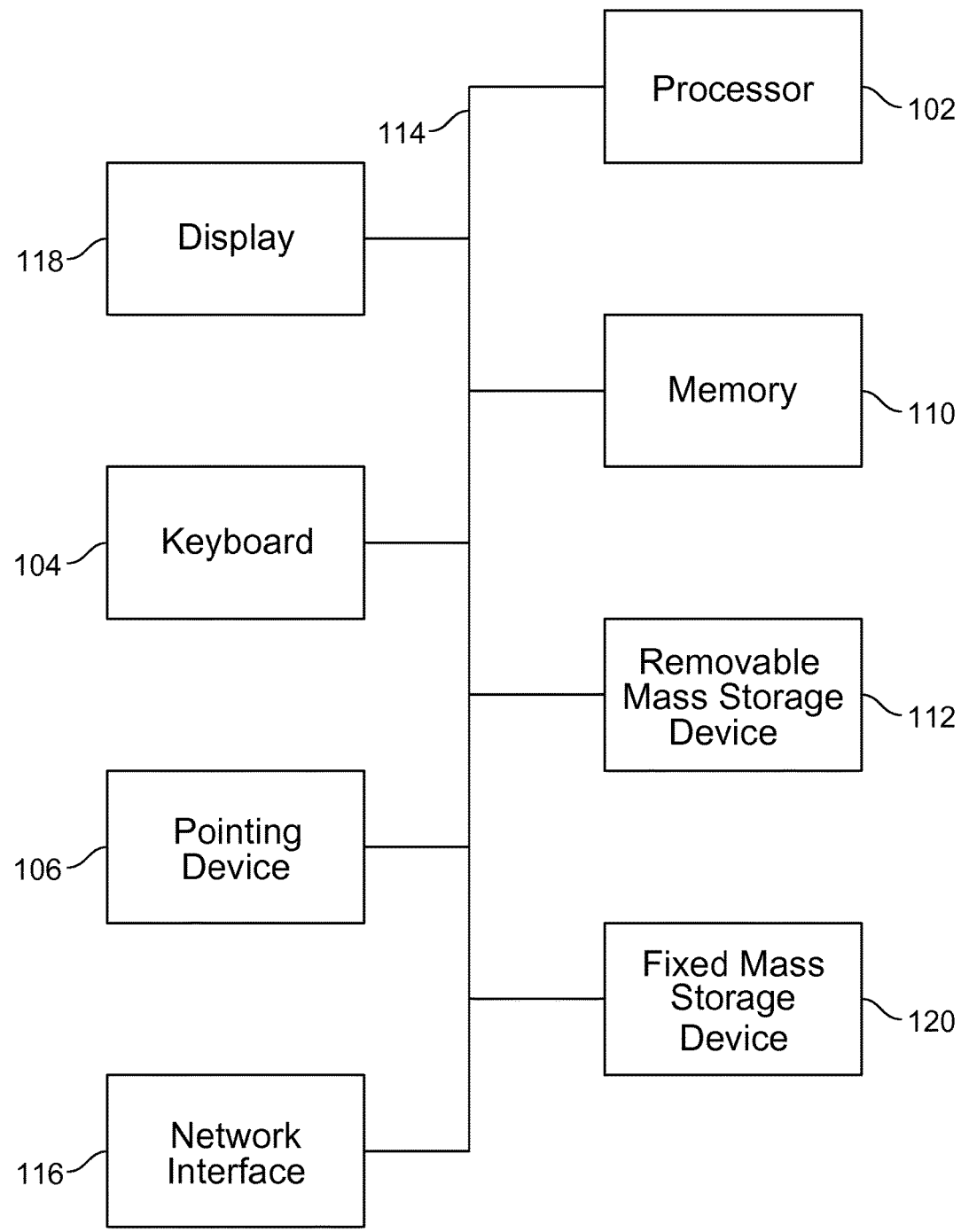
FIG. 1 is a functional diagram illustrating a programmed computer system for distributed workflows in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A proxy for snapshot backup and recovery is disclosed. Although Microsoft Windows Server 2012 may provide a function for a local node to backup data at either the local node or a remote node, it does not provide a function for a local node to recover data at the remote node.

Throughout this specification "node" refers without loss of generality to, for example, a node of a cluster platform, but any person having ordinary skill in the art would recognize the proxy concept may simply be extended to non-cluster platforms. Throughout this specification the term "remote" may generally refer to any node not local in either physical or virtual space; for example a node remote to a proxy node may include a VM on the same physical node as the proxy VM that is not the proxy VM itself. A single node 'Proxy' that can both backup to and restore data from one or more remote nodes is thus responsible for backup/restore operations on behalf of said one or more remote nodes in the cluster environment. Such a Proxy Client may run on either a physical cluster node or a VM and may backup and recover the VMs and File Servers for an entire cluster environment.

Leveraging existing Microsoft Windows Server 2012 infrastructure to enable restoration and/or reconstructing of a snapshot at a remote physical or virtual node is disclosed. Existing Microsoft Windows Server 2012 infrastructure comprises one or more of the following:
- Microsoft Windows Server 2012 Cluster;
- Microsoft Volume Shadow copy Service ("VSS");
- Microsoft Cluster Shared Volume ("CSV") Shadow copy Provider;
- Microsoft File Share Shadow Copy Provider;
- Microsoft generic file server;
- Microsoft Scale Out file server;
- Microsoft CSV shared disk;
- Server Message Block 3.0 ("SMB3") protocol;
- Microsoft Cluster Administration credentials; and the
- Microsoft Windows Management Instrumentation ("WMI") management Application Programming Interface ("API").

Although the specification describes in detail the Microsoft Windows Server 2012 infrastructure, any person having ordinary skill in the art would recognize that the principals described herein may be extended to any operating system with similar infrastructure and/or feature set.

A preferred method of leveraging the existing operating system infrastructure comprises recording backup components close to the time of the backup by the use of one or more plug-ins at the proxy. Throughout this specification, the term 'backup components' refer to any metadata regarding a backup needed for a restore, for example VM configuration metadata and data files, and/or credentials for file shares. During restoration, the backup components may be "played back" to simulate and/or emulate a typical operating system (local) restore.

As any person having ordinary skill in the art would recognize, the principles of a Proxy Client responsible for backup/restore operations on a remote node in a cluster may be extended to any application. Two important examples comprise one or more of the following:

a. Hyper-V Cluster Proxy for VM image backup and restore. For example, a virtual machine proxy server that can backup and restore Microsoft Hyper-V images of VMs on a remote node up to and including the entire cluster environment; and a b. Cluster File Server Proxy for backup and recovery of a file server in a remote node up to and including the entire cluster. The file server may be a generic file server or a Scale Out file server. If a Hyper-V Cluster Proxy and Cluster File Server Proxy co-exist on a node, both Proxies may be managed and spawned by the same instance of a client agent.

The Proxy Client may achieve the following:

1. Leverage and Enhance the Windows Server 2012 Server Platform.

The framework in the Microsoft Windows Server 2012 operating system/server may take snapshots of volumes on a remote node. A Microsoft Clustered Shared Volume VSS writer may also have the capability to report backup components, metadata related to the snapshot, on behalf of a remote node. The backup software may not only back up the local image of VMs, but may also back up a VM image located on a remote node's storage. As such, a single node "Proxy" may be responsible for the backup operations on behalf of several remote nodes within a cluster environment.

In addition to using Microsoft CSV shared disks, the Microsoft Windows Server 2012 Hyper-V can use a SMB3 protocol-based file server as the shared storage for live migration and file services. For example, a Microsoft Windows Server 2012 server comes with the SMB3 shadow copy provider that can take a snapshot of a remote SMB3 file server. The Proxy Client may take advantage of the SMB3 shadow provider and back up the Hyper-V and file service data remotely.

2. Minimize the Workload Impact on Cluster Nodes.

The Proxy architecture does not require backup and recovery operations to be conducted on each of the cluster nodes. All operation activities may be offloaded to a single proxy cluster node or a VM. This could allow some or all of the other cluster nodes to fully engage their regular workloads without any backup/recovery operation interruptions.

3. Enhanced Deployment Model.

Clustered environments may be scalable; Microsoft Windows Server 2012 supports up to 63 nodes in a cluster. By contrast, to perform a Hyper-V image or cluster file service backup/recovery without a Proxy Client, backup software is required to be installed on each Hyper-V physical node that is expected to participate in operations; a cumbersome operation considering the number of nodes in a data center for backup software logic and installation work for software deployment. With a proxy, backup software may run on a physical node, a VM, or both, and may be migrated automatically, without the need to prepare extra hardware or configure extra cluster nodes.

4. Leverage Virtual Machine Highly Available Capability.

Microsoft Windows Server 2012 may require backup software to be "highly available" in a "Continuously Available" Cluster platform. When the backup software is running on a physical node, in order to be constantly available and running, it should have a "hot stand-by" physical node for the backup software. This "hot stand-by" physical node should run on a "highly available" framework, e.g., a cluster. Then, in case of a primary node shutdown, the backup software may be able to automatically switch to the "hot stand-by" node. With a proxy, a VM Proxy architecture is introduced as an optional platform. Since the "VM" may be migrated from node to node, extra hardware for the backup "stand-by" node may not be necessary.

Backup software could thus be run on a VM and migrated automatically, rather than installing dedicated backup software on physical nodes in the cluster. Throughout this specification, "dedicated" backup software refers to software that needs to be installed, for example, on top of any software provided by the basic operating system. Usually dedicated backup software refers to software either a) of third-party origin, for example, not from Microsoft Corporation, or b) an additional or optional package from the operating system vendor not included in the basic distribution of the operating system, for example, not included in Windows Server 2012, Windows Server 2012 Pro, Windows Server 2012 Enterprise and/or Windows RT. This may reduce the need to prepare extra hardware or configure additional cluster nodes. These features could be realized using a development framework or API, such as the WMI framework, to collect backup information from remote nodes.

In one embodiment, a backup proxy VM may reside on a storage system architecturally separate from one or more target VM's. The proxy VM could be connected to the target VM's in a clustered configuration, such as in a Microsoft Windows Server 2012 Cluster Environment. The proxy VM could access a cluster writer and/or cluster backup tools, such as the Microsoft CSV Shadow Copy Provider, to perform remote backup operations.

In one embodiment, the backup operation backs up the snapshot taken by the Shadow provider(s). The restore operation does not necessarily need to take any snapshots beyond the VM snapshot, for example it does not need the volume shadow copy snapshot. The restore may simply "copy" the backup saveset to the specified location and fix up the restored VM configurations by using the WMI.

An example embodiment of a workflow discussing the backup and restore operations, wherein workflow steps may not be sequential, includes:

Step 1. Provision a Proxy Server.

Backup software may be installed on a proxy server. For example, client and configuration utilities may be installed on the proxy. This proxy joins a cluster, and the software properly configured to register the backup proxy. The proxy may either be a physical or a virtual machine.

Step 2. Backup Operation.

The proxy backup software on the VM or physical node does backups by performing the one or more steps of:
- retrieving targeted shadow copies, for examples CSVs, from a targeted VM list;
- verifying the targeted VMs are included as a component;
- taking a snapshot using a snapshot tool, such as the Microsoft VSS framework in conjunction with the Microsoft CSV Shadow Copy Provider;
- retrieving backup components using a Microsoft VSS writer, such as a Microsoft CSV Shadow Copy Provider. The Microsoft CSV Shadow Copy Provider reports the components on behalf of a remote Hyper-V writer. VM configuration and data files may be manually gathered through a WMI interface; and
- storing backup components and completing the backup operation.

Step 3. Restore Operation.

The proxy is used to restore by performing the one or more steps of:
- retrieving backup components of the VM or other backup metadata to be restored, for example metadata described in the backup session that contain the necessary information for restore operations;
- restoring the files to the desired location;
- leveraging a framework, such as the WMI, to perform a reconstruction operation, in part by:
  - removing the existing VM from the desired location if it already exists;
  - creating a VM using the existing files and/or merging a VM from an incremental backup;
  - bringing the VM online;
  - enabling the VM as a cluster VM and performing any necessary join operations; and
  - migrating the VM to the specified cluster node.
- In an embodiment, all the reconstruction operations can be accomplished via the WMI without using a VSS framework; and
- completing the restore operation.

FIG. 1 is a functional diagram illustrating a programmed computer system for distributed workflows in accordance with some embodiments. As shown, FIG. 1 provides a functional diagram of a general purpose computer system programmed to execute workflows in accordance with some embodiments. As will be apparent, other computer system architectures and configurations can be used to execute workflows. Computer system 100, which includes various subsystems as described below, includes at least one microprocessor subsystem, also referred to as a processor or a central processing unit ("CPU") 102. For example, processor 102 can be implemented by a single-chip processor or by multiple cores and/or processors. In some embodiments, processor 102 is a general purpose digital processor that controls the operation of the computer system 100. Using instructions retrieved from memory 110, the processor 102 controls the reception and manipulation of input data, and the output and display of data on output devices, for example display 118.

Processor 102 is coupled bi-directionally with memory 110, which can include a first primary storage, typically a random access memory ("RAM"), and a second primary storage area, typically a read-only memory ("ROM"). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 102. Also as well known in the art, primary storage typically includes basic operating instructions, program code, data and objects used by the processor 102 to perform its functions, for example programmed instructions. For example, primary storage devices 110 can include any suitable computer-readable storage media, described below, depending on whether, for example, data access needs to be bi-directional or uni-directional. For example, processor 102 can also directly and very rapidly retrieve and store frequently needed data in a cache memory, not shown.

A removable mass storage device 112 provides additional data storage capacity for the computer system 100, and is coupled either bi-directionally (read/write) or uni-directionally (read only) to processor 102. For example, storage 112 can also include computer-readable media such as magnetic tape, flash memory, PC-CARDS, portable mass storage devices, holographic storage devices, and other storage devices. A fixed mass storage 120 can also, for example, provide additional data storage capacity. The most common example of mass storage 120 is a hard disk drive. Mass storage 112, 120 generally store additional programming instructions, data, and the like that typically are not in active use by the processor 102. It will be appreciated that the information retained within mass storage 112, 120 can be incorporated, if needed, in standard fashion as part of primary storage 110, for example RAM, as virtual memory.

In addition to providing processor 102 access to storage subsystems, bus 114 can be used to provide access to other subsystems and devices as well. As shown, these can include a display monitor 118, a network interface 116, a keyboard 104, and a pointing device 106, as well as an auxiliary input/output device interface, a sound card, speakers, and other subsystems as needed. For example, the pointing device 106 can be a mouse, stylus, track ball, or tablet, and is useful for interacting with a graphical user interface.

The network interface 116 allows processor 102 to be coupled to another computer, computer network, or telecommunications network using a network connection as shown. For example, through the network interface 116, the processor 102 can receive information, for example data objects or program instructions, from another network, or output information to another network in the course of performing method/process steps. Information, often represented as a sequence of instructions to be executed on a processor, can be received from and outputted to another network. An interface card or similar device and appropriate software implemented by, for example executed/performed on, processor 102 can be used to connect the computer system 100 to an external network and transfer data according to standard protocols. For example, various process embodiments disclosed herein can be executed on processor 102, or can be performed across a network such as the Internet, intranet networks, or local area networks, in conjunction with a remote processor that shares a portion of the processing. Throughout this specification "network" refers to any interconnection between computer components including the Internet, Ethernet, intranet, local-area network ("LAN"), home-area network ("HAN"), serial connection, parallel connection, wide-area network ("WAN"), Fibre Channel, PCI/PCI-X, AGP, VLbus, PCI Express, Expresscard, Infiniband, ACCESS.bus, Wireless LAN, WiFi, HomePNA, Optical Fibre, G.hn, infrared network, satellite network, microwave network, cellular network, virtual private network ("VPN"), Universal Serial Bus ("USB"), FireWire, Serial ATA, 1-Wire, UNI/O, or any form of connecting homogenous, heterogeneous systems and/or groups of systems together. Additional mass storage devices, not shown, can also be connected to processor 102 through network interface 116.

An auxiliary I/O device interface, not shown, can be used in conjunction with computer system 100. The auxiliary I/O device interface can include general and customized interfaces that allow the processor 102 to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a computer readable medium that includes program code for performing various computer-implemented operations. The computer-readable medium is any data storage device that can store data which can thereafter be read by a computer system. Examples of computer-readable media include, but are not limited to, all the media mentioned above: magnetic media such as hard disks, floppy disks, and magnetic tape; optical media such as CD-ROM disks; magneto-optical media such as optical disks; and specially configured hardware devices such as application-specific integrated circuits ("ASIC"s), programmable logic devices ("PLD"s), and ROM and RAM devices. Examples of program code include both machine code, as produced, for example, by a compiler, or files containing higher level code, for example a script, that can be executed using an interpreter.

The computer system shown in FIG. 1 is but an example of a computer system suitable for use with the various embodiments disclosed herein. Other computer systems suitable for such use can include additional or fewer subsystems. In addition, bus 114 is illustrative of any interconnection scheme serving to link the subsystems. Other computer architectures having different configurations of subsystems can also be utilized.

Figure 2:
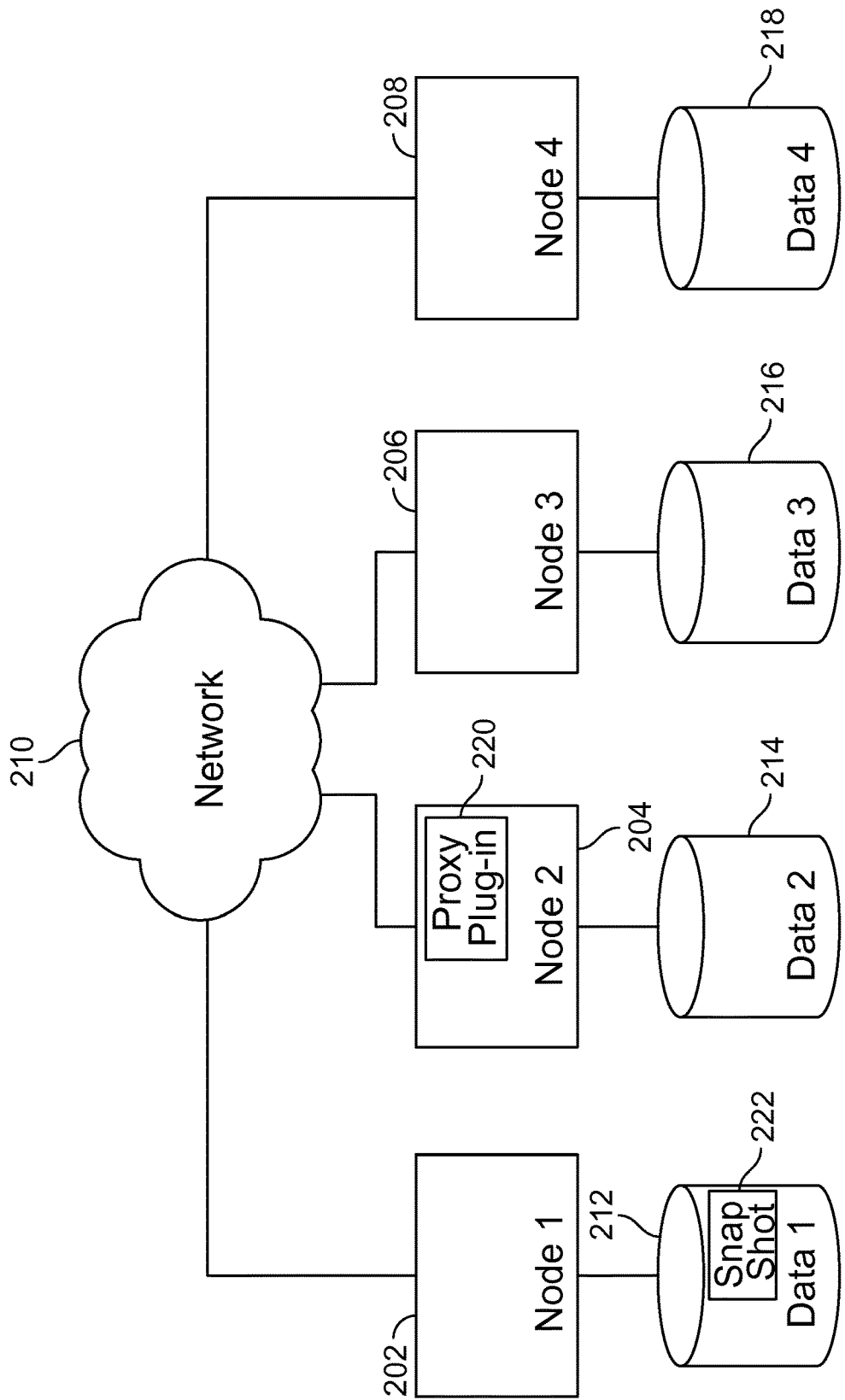
FIG. 2 is a block diagram illustrating an embodiment of a system for a cluster proxy.

FIG. 2 is a block diagram illustrating an embodiment of a system for a cluster proxy. Nodes 202, 204, 206, 208 are coupled via network 210 to each other and to their respective data systems 212, 214, 216, 218. Collectively, these nodes and network are a cluster and/or cluster environment.

One node is considered a proxy node and/or proxy client node responsible for backup/restore of one or more other nodes in the cluster. The proxy node comprises one or more proxy plug-ins, here shown as one proxy plug-in 220, which is installed as backup software on node 204. Using the existing operating system mechanics a backup snapshot 222 may be taken on node 202, and stored in its respective data system 212. Without the need to install dedicated backup software on remote node 202, i.e. "remote" to proxy node 204, restoring snapshot 222 to node 202 remotely at node 204 is disclosed.

Any person having ordinary skill in the art would recognize that the use of proxy plug-ins and snapshots is generic in nature and may be applied to various backup/restore operations. Two important examples comprise the Hyper-V Cluster Proxy for VM image restore of a remote physical/virtual machine, and the Cluster File Server Proxy for recovery of a file server in a remote node.

Figure 3A:
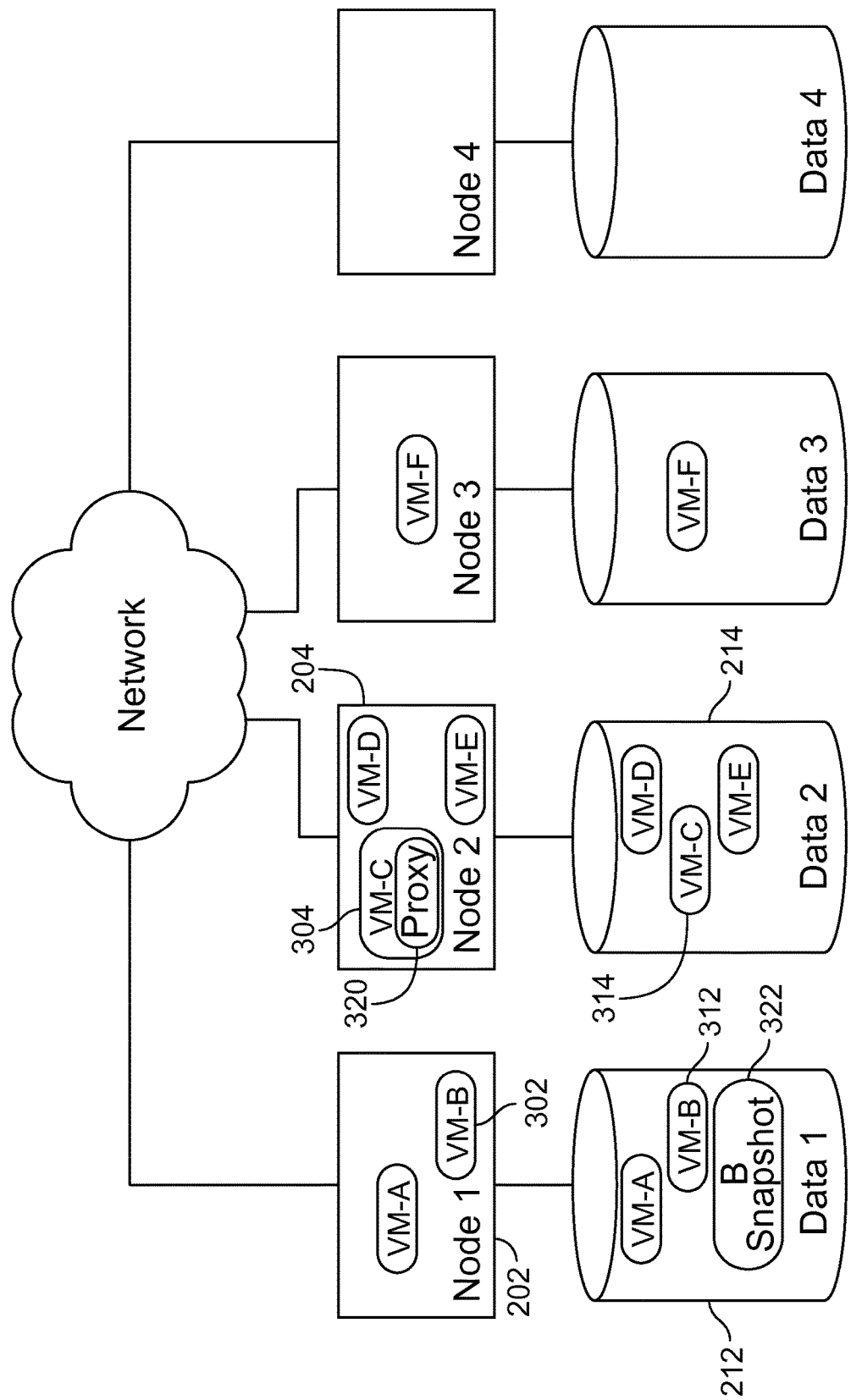
FIG. 3A is a block diagram illustrating an embodiment of a system for a VM image cluster proxy.

FIG. 3A is a block diagram illustrating an embodiment of a system for a VM image cluster proxy. Any person having ordinary skill in the art would recognize that although the Microsoft Hyper-V is a native hypervisor visualization technology, the techniques described herein are generic to hosted hypervisor technology and other virtualization technology. In some embodiments the cluster shown in FIG. 3A is a specific example of a Hyper-V Cluster Proxy for the system in FIG. 2.

In the example shown, the proxy VM 304 is named "VM-C" on physical node 204, with corresponding data (virtual disk, virtual memory for hibernation, etc) for VM 304 stored in a portion 314 of data system 214. Similarly, a remote node 202 comprises a remote VM 302 named "VM-B" with corresponding data for VM 302 stored in a portion 312 of data system 212. Microsoft Windows Server 2012 includes the ability for VM-C 304 to take a remote snapshot of VM-B 302 and store the snapshot 322 in data system 212. Without the need to install dedicated backup software on either remote physical node 202 or remote VM 302, reconstructing snapshot 322 to VM-B 302 remotely at VM-C 304 is disclosed.

Figure 3B:
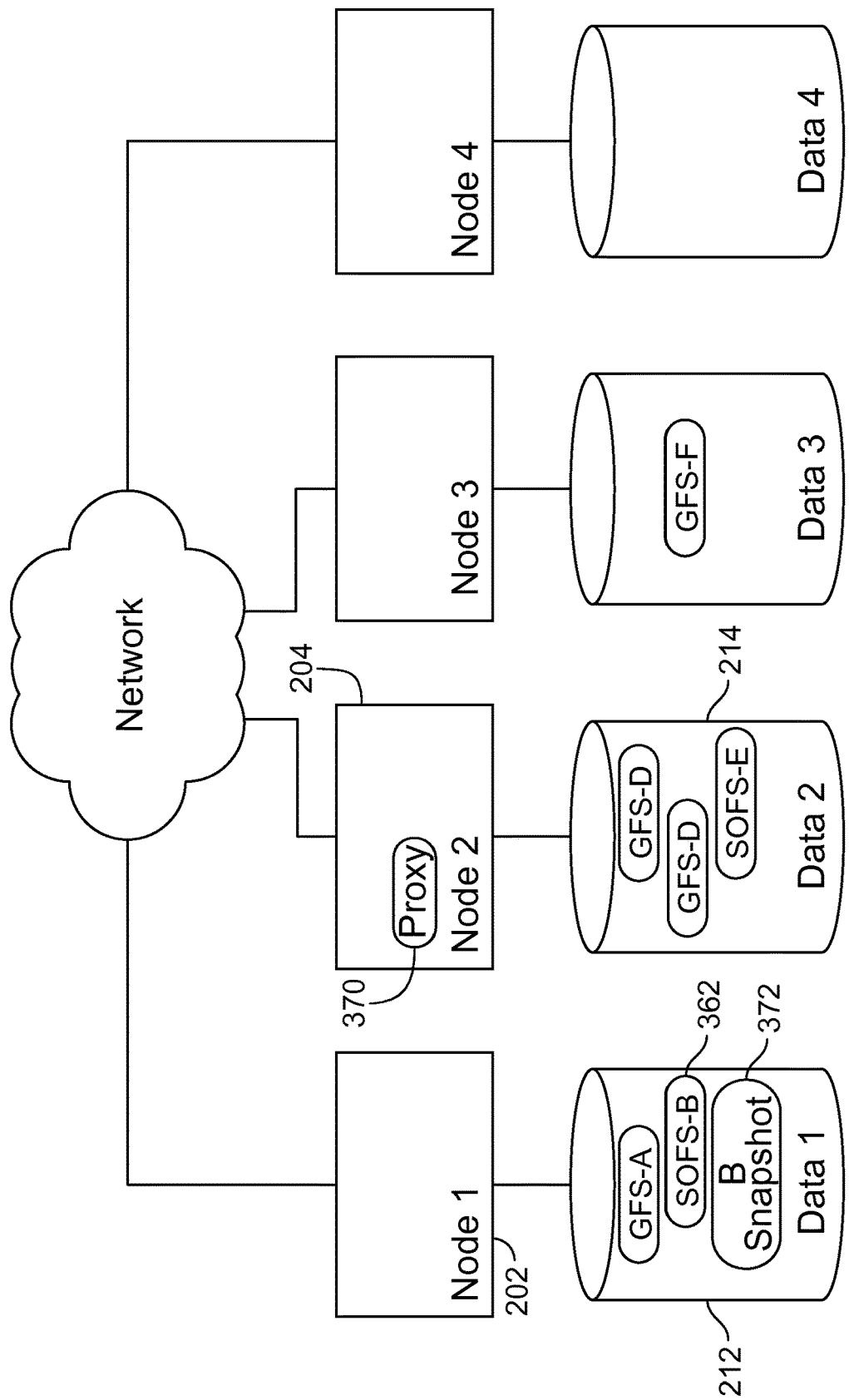
FIG. 3B is a block diagram illustrating an embodiment of a system for cluster file server proxy.

FIG. 3B is a block diagram illustrating an embodiment of a system for cluster file server proxy. Any person having ordinary skill in the art would recognize that although for clarity Scale Out file systems are discussed, the techniques described herein are generic to any file system. Any person having ordinary skill in the art would recognize that although FIG. 3B for clarity discusses without loss of generality an example with physical nodes, the same principles may be used for VMs or virtual nodes.

In the example shown, the proxy 370 is associated with node 204 and its associated data system 214. Node 202 is a file server including a Scale Out File Share 362 named "SOFS-B" in its data system 212. Microsoft Windows Server 2012 includes the ability for Node 204 to take a remote backup snapshot 372 of SOFS-B 362. Without the need to install dedicated backup software on node 202, restoring snapshot 372 to SOFS-B 362 remotely at node 214 is disclosed. In some embodiments, the backup data may be a file in a file share, a plurality of files in the file share, or the entire file share.

Figure 4:
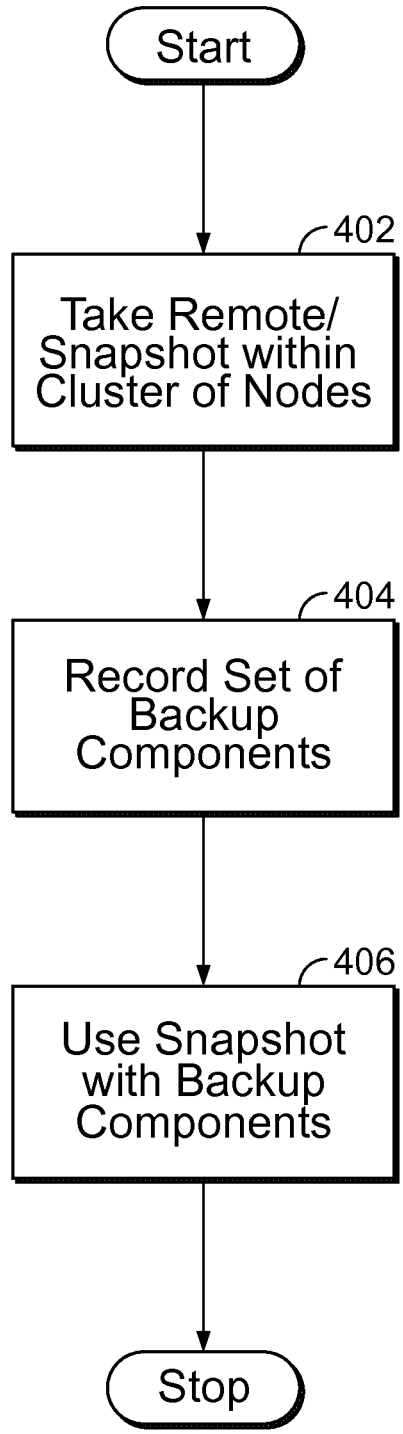
FIG. 4 is a flow chart illustrating an embodiment of a process for backup and restore using a cluster proxy.

FIG. 4 is a flow chart illustrating an embodiment of a process for backup and restore using a cluster proxy. In some embodiments, the process of FIG. 4 is carried out by proxy 220 in FIG. 2, proxy 320 in FIG. 3A, and/or proxy 370 in FIG. 3B.

In an optional step (not shown) before step 402, a node proxy for recovery (and backup) is provisioned from amongst the cluster of nodes. The node proxy may be one or more of: a physical node within the cluster of nodes; a proxy virtual machine on a node within the cluster of nodes; and a proxy virtual machine on a node on a different Windows cluster. The cluster may be a Microsoft Windows Server 2012 Cluster. In the remainder of the cluster of nodes, the remote nodes (physical or virtual) may not have one or more of: a restore agent; a backup client; and dedicated backup software.

In step 402, a remote/snapshot is taken within the cluster of nodes. The node proxy may take the snapshot. The snapshot may be a full backup or may be an incremental backup. The snapshot may be a copy-on-write snapshot or a shadow snapshot.

For a Hyper-V Cluster Proxy embodiment, a snapshot tool such as Microsoft VSS framework and Microsoft CSV Shadow Copy Provider may be used to take the snapshot. For a Cluster File Server Proxy embodiment, a snapshot tool such as Microsoft CSV Shadow Provider may be used for data served by a Scale Out file server, a snapshot tool such as a local file system backup may be used for data owned by the node proxy and the data is served by a generic file server, and a snapshot tool such as Microsoft File Share Shadow Copy Provider may be used for data served by a generic file server.

In step 404, a set of backup components is recorded. An archive agent may be used in part to deduplicate the backup components data on the snapshot using a deduplication engine.

For a Hyper-V Cluster Proxy embodiment, the proxy records the backup components reported by a) the Microsoft VSS CSV Writer if the remote VM is running on a physical node other than the one associated with the proxy VM; or b) the Microsoft Hyper-V VSS Writer if the remote VM is running on the physical node associated with the proxy VM. Additionally or alternately, the Microsoft Windows Management Instrumentation ("WMI") management API may be used in part to record. These backup components/metadata files, for example a backup component document and writer metadata XML ("eXtensible Markup Language") are associated with the snapshot. For a Cluster File Server Proxy embodiment, an archive agent is used to record necessary backup metadata and for example, credentials, to complete the backup operation.

In step 406, the snapshot is used/interpreted with backup components to recover, that is restore or reconstruct, the remote node.

For a Hyper-V Cluster Proxy embodiment, a client agent and archive agent starts the proxy plug-in 320 to handle the restore request by loading the backup components and sending backup components to a proxy helper service, in part using Microsoft WMI. The proxy helper service performs pre-restore operations and requests the archive agent to copy and restore the VM to a specified Cluster location, e.g. the physical node associated with the remote VM. The proxy helper service then may perform post restore operations such as adjusting VM configuration, using a WMI method to bring up the VM in the Hyper-V Manager, using WMI APIs to enable the VM as a cluster-wide VM or migrating to an original node. For a Cluster File Server Proxy embodiment, a client agent starts the proxy plug-in 370 to request a proxy helper service to determine the target location in part by using the UNC ("Universal Naming Convention") path in some embodiments, in part by using credentials previously established (for example Microsoft Cluster Administration credentials) by a proxy helper service. In some embodiments, the proxy interfaces with a WMI management API to determine ownership of the data.

Preferred Embodiment.

The preferred embodiment is to name a server as an "Avamar" server, a client agent as "Avagent" and an archive agent as "Avtar" (Avamar is a registered trademark of EMC Corporation, and Avagent and Avtar are trademarks of EMC Corporation). Any person having ordinary skill in the art would recognize that the techniques described herein could be generalized for any server, client agent, and archive agent. The following is but one embodiment of the general techniques described herein.

Proxy Virtual Client Components

Hyper-V and Cluster File Server Proxy Virtual Client may be composed of the following components:

Virtual Client Cluster Group.

A Proxy Virtual Client may be instantiated as a "Cluster Group" in the Windows cluster environment. An Avamar "Cluster Group" may be provisioned by the Cluster Configuration Tool and provide continuous availability for backup and recovery operations. There may be one or more Avamar cluster resources in the Avamar Cluster Group:

Avagent.

The Avagent is responsible for communicating with the Avamar Server console. The Avagent may have the same operations for a Proxy Client as for a single node client. The Proxy Avagent may run on its own IP address and node name to provide "single DPN client" operations on behalf of the entire cluster.

Node Cluster Resource.

A Cluster Node Resource may be created and registered by the Avagent as the node name of the Proxy Virtual Client.

IP Cluster Resource.

A Cluster Node IP address may be created and registered by the Avagent as the address of the Proxy Virtual Client.

Proxy Helper Service.

One purpose of the Helper Service is to interface with the Windows platform environment, for example WMI. All the backup core functions may still remain in the plug-in itself. The service may be used by both the File Server Proxy and Hyper-V plug-in proxy which are spawned by the Avagent when workorders are received. The Proxy Helper Service may need to run on an account with cluster administration privileges.

Logging.

For logging purposes, a third-party tool such as Apache Log 4net may be used.

Hyper-V Cluster Proxy Plug-in.

The Hyper-V Cluster Proxy plug-in may be responsible for the backup and recovery operations of the VMs on a node in the cluster, up to the entire cluster environment. It may interface with the Proxy Helper Service to query and administrate the VM Cluster resources. It may interact with the VSS Cluster Shadow Provider and Cluster VSS Writer for backup operations.

Cluster File Server Proxy Plug-in.

The Cluster File Server Proxy plug-in may be responsible for the backup and recovery operation of all the file servers in a cluster. Similar to the Hyper-V Cluster Proxy, the File Server Proxy also may interface with the Helper Service and VSS components to conduct the backup and recovery operations and manage the file servers and share folders. If a Hyper-V plug-in and File Server plug-in co-exist on the Proxy node, both plug-ins may be managed and spawned by the same instance of the Avagent.

Avtar.

Avtar may handle UNC paths and may behave the same for the Proxy plug-in as it would for any other plug-ins. It receives the backup or recovery target list from the plug-in and saves or recovers the required data to or from the Avamar Server.

Proxy Operation Overview

Figure 5A:
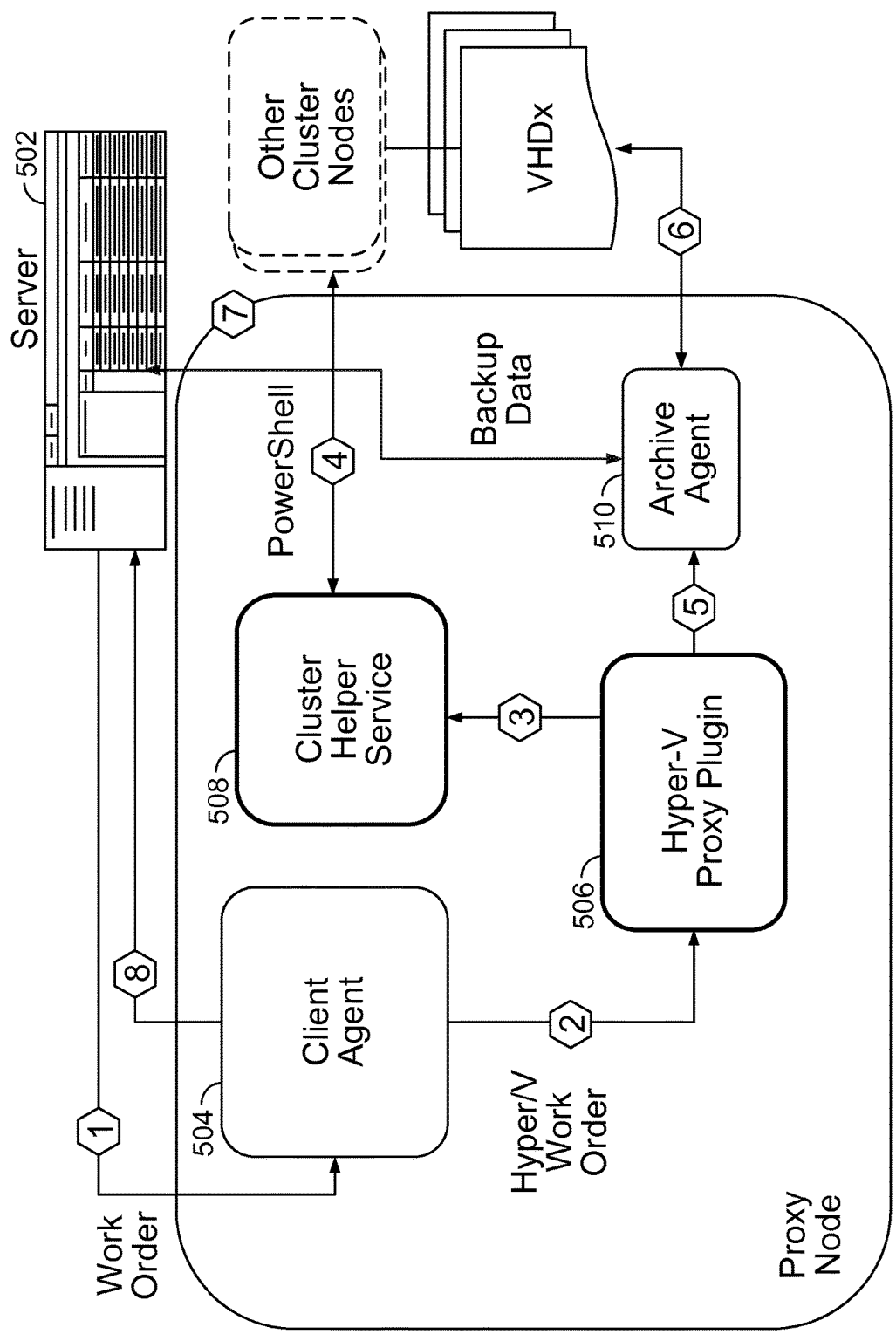
FIGS. 5A and 5B illustrate an embodiment of a system for proxy operation for the Hyper-V Proxy and Cluster File Proxy, respectively.
Figure 5B:
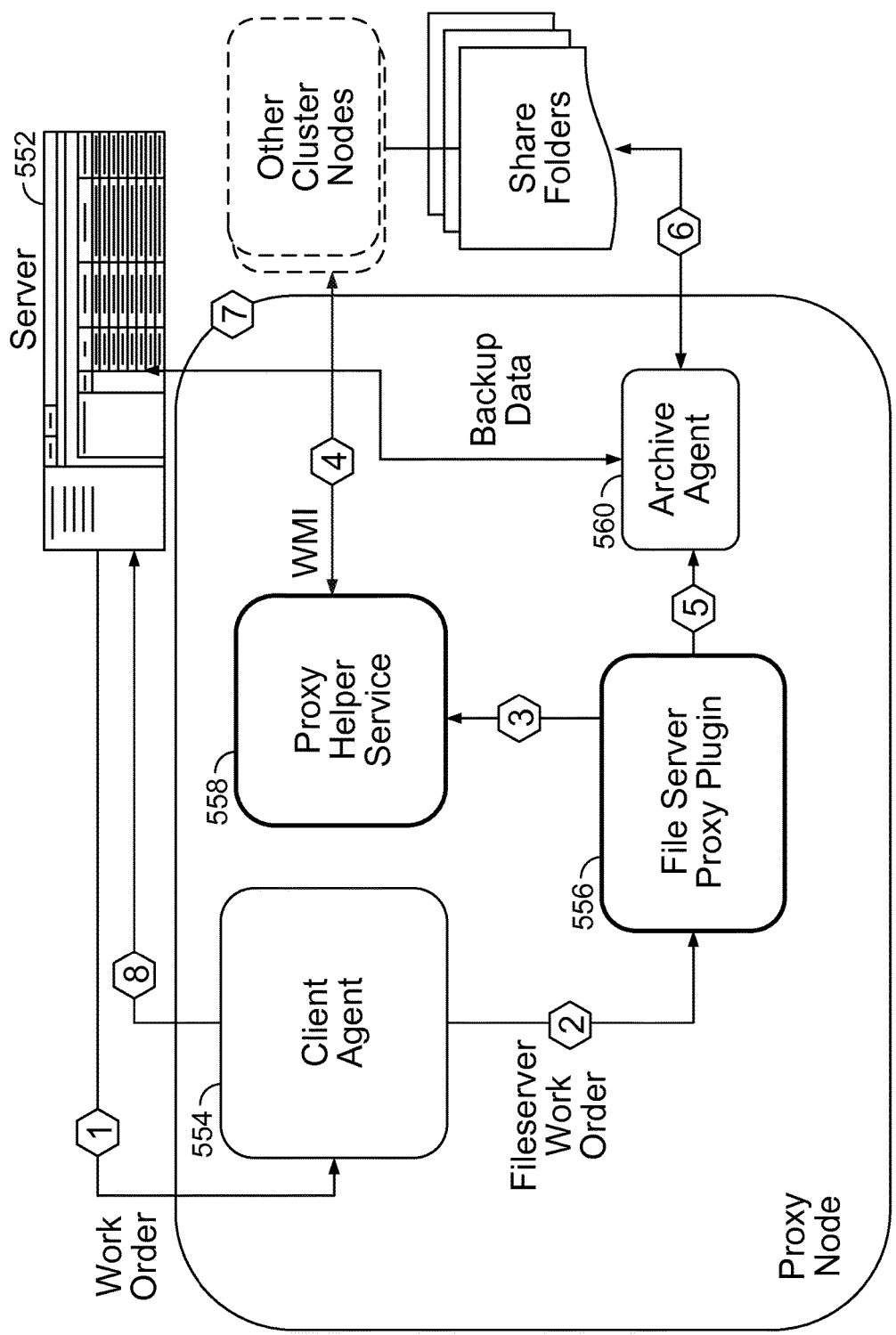

FIGS. 5A and 5B illustrate an embodiment of a system for proxy operation for the Hyper-V Proxy and Cluster File Proxy, respectively.

In FIG. 5A, the Hyper-V Proxy virtual client operates backup and recovery as follows, as depicted by the step number surrounded by a hexagon:

Step 1. The Avamar Server 502 Console sends a workorder;

Step 2. The Avagent 504 deciphers the workorder from the Avamar Server and spawns the Hyper-V Proxy plug-in 506;

Step 3. The Hyper-V Proxy plug-in 506 interacts with the Helper Service 508 to query and set the required information. The Hyper-V Proxy plug-in 506 may interact with other cluster nodes, for example over Power Shell. For example, if the workorder requests an incremental backup for Hyper-V, the Proxy Helper Service 508 enables the WMI Hyper-V incremental flag for every cluster node;

The VSS Shadow Provider may be responsible for taking and/or creating the snapshot of a backup volume during the backup operation. The Proxy client requests the appropriate shadow provider according to the volume type:

If the volume is a Cluster Shared Volume (CSV), the proxy requests the "Microsoft CSV Shadow Copy Provider".

If the volume is a local disk, the proxy requests the "Microsoft Software Shadow Copy provider".

If the volume is an SMB3.0 file share, the proxy requests the "Microsoft File Share Shadow Copy provider".

Step 4. The plug-in spawns the Avtar 510 with the target list to perform the required operations;

Step 5. The Avtar 510 may perform the required operation on the Proxy client. For example, if the workorder is a restore image, the Avtar 510 retrieves the virtual hard disk, for example in VHDx virtual hard disk format;

Step 6. The Avtar 510 may perform the required operation with the Avamar Server 502. For example, if the workorder is a backup operation, Avtar 510 accesses the VHDx file on the snapshot and copies the data to the Avamar Server 502;

Step 7. After the operation completes, the Proxy performs the post-restore or post-backup operations. The post-restore operation includes interfacing with the Proxy Helper Service 508 to adjust up the restored VMs and bring them online; and Step 8. Avagent 504 collects operations and reports the status back to the server.

In FIG. 5B, the Cluster File Server Proxy client operates backup and recovery as follows, as depicted by the step number surrounded by a hexagon:

Step 1. The Avamar Server 552 Console sends a workorder;

Step 2. The Avagent 554 deciphers the workorder from the Avamar Server and spawns the Cluster File Server Proxy plug-in 556;

Step 3. The Cluster File Server Proxy plug-in 556 interacts with the Helper Service 558 to query and set the required information. The Cluster File Server Proxy plug-in 556 may interact with other cluster nodes, for example over WMI;

Step 4. The plug-in spawns the Avtar 560 with the target list to perform the required operations;

Step 5. The Avtar 560 may perform the required operation with the denoted nodes in the cluster. For example, if the workorder is a restore cluster file server operation, the Avtar interprets and/or retrieves the save set on the specified UNC locations;

Step 6. The Avtar 560 may perform the required operation with the Avamar Server 552. For example, if the workorder is a backup operation, Avtar 560 accesses the data from the Cluster Shared disk and copies the data from the disk to the Avamar Server 552;

Step 7. After the operation completes, the Proxy performs the post-restore or post-backup operations; and Step 8. Avagent 554 collects operations and reports the status back to the server.

Hyper-V Cluster Proxy Virtual Client Architecture

Unlike the Windows 2008R2 federated architecture, a Hyper-V Cluster Proxy Plug-in and the Proxy Helper Service may be designed to operate the backup and recovery operation for the entire cluster as a single node. The inter-agent communication in some cases may no longer be used in the Hyper-V Proxy Plug-in.

Hyper-V Proxy Virtual Client Runs on a Hyper-V Cluster Node.

After the Avamar base client and Hyper-V plug-in are installed on a Hyper-V cluster node, the Proxy Virtual Client may be instantiated as a "Cluster Group" service in the Windows Cluster environment. The Proxy Client may provision at least two nodes in a cluster environment to avoid single node failure.

Figure 6:
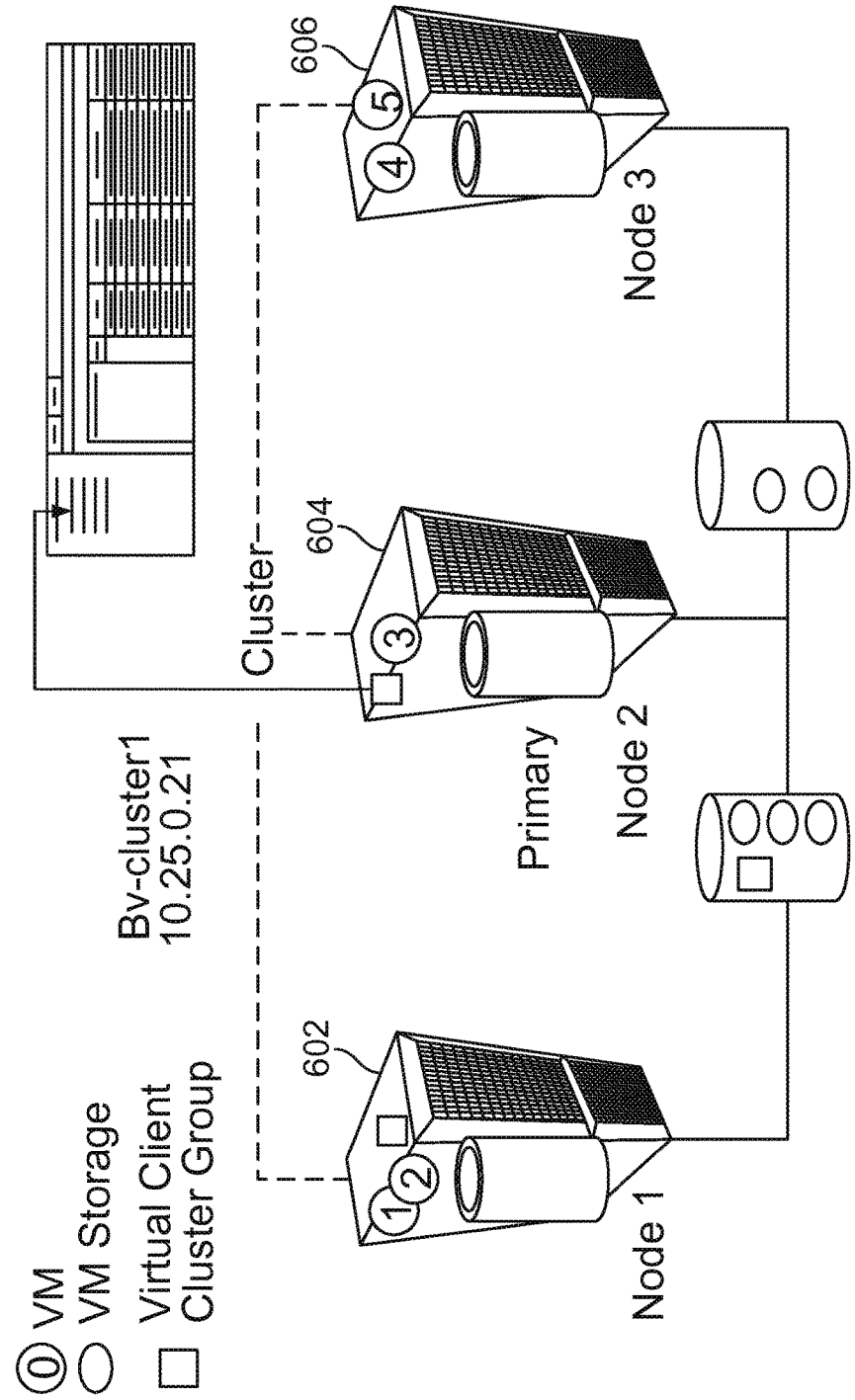
FIG. 6 illustrates the major component interactions of a Backup Proxy Virtual Client on a Hyper-V cluster node by way of example.

FIG. 6 illustrates the major component interactions of a Backup Proxy Virtual Client on a Hyper-V cluster node by way of example. In the example of FIG. 6:

There is a three-node Hyper-V cluster with five VMs (denoted by a solid circle around a VM identity number). These VMs store their virtual machine files on CSVs.

Two VMs (#1, #2) are active on Node 1 602, one VM (#3) is active on Cluster Node 2 604 and two VMs (#4, #5) are active on Cluster Node 3 603.

The Proxy Client (denoted by a solid lighter square) is instantiated and activated on Node 2 604. The following one or more cluster services run in the Virtual Client Cluster Group:

Avagent service

Proxy Helper service

IP address resource

Node name resource.

Node 1 602 is also provisioned to run the Proxy Virtual Client (denoted by the hollow square). Both Avagent and Helper services are registered in Node 1's registry. If Node 2 is offline, Node 1 can immediately take over as the Proxy Client for the cluster.

The Proxy Virtual Client Cluster Group is registered as an Avamar backup client in the Avamar Server with its own unique IP address and node name.

Because several VMs are not running on Node 2 604 associated with the proxy Virtual Client, the Cluster VSS Writer will report the remote VMs components during the backup operation. The following table illustrates the VSS writer reporting components:

|  | Hyper-V VSS Writer | Cluster Shared Volume VSS Writer |
| --- | --- | --- |
| Node 1 (602) | N/A | VM1 and VM2 |
| Node 2 (604) - Virtual Client node. | VM 3 | N/A |
| Node 3 | N/A | VM4 and VM5 |

Proxy Virtual Client Runs on a Virtual Machine (VM).

Windows Server 2012 clusters allow a VM to join a Hyper-V cluster composed of a group of Physical Cluster nodes. With this new Windows Server 2012 feature, Hyper-V Image Backup software can run on a Virtual Machine (VM) and be migrated automatically.

Figure 7:
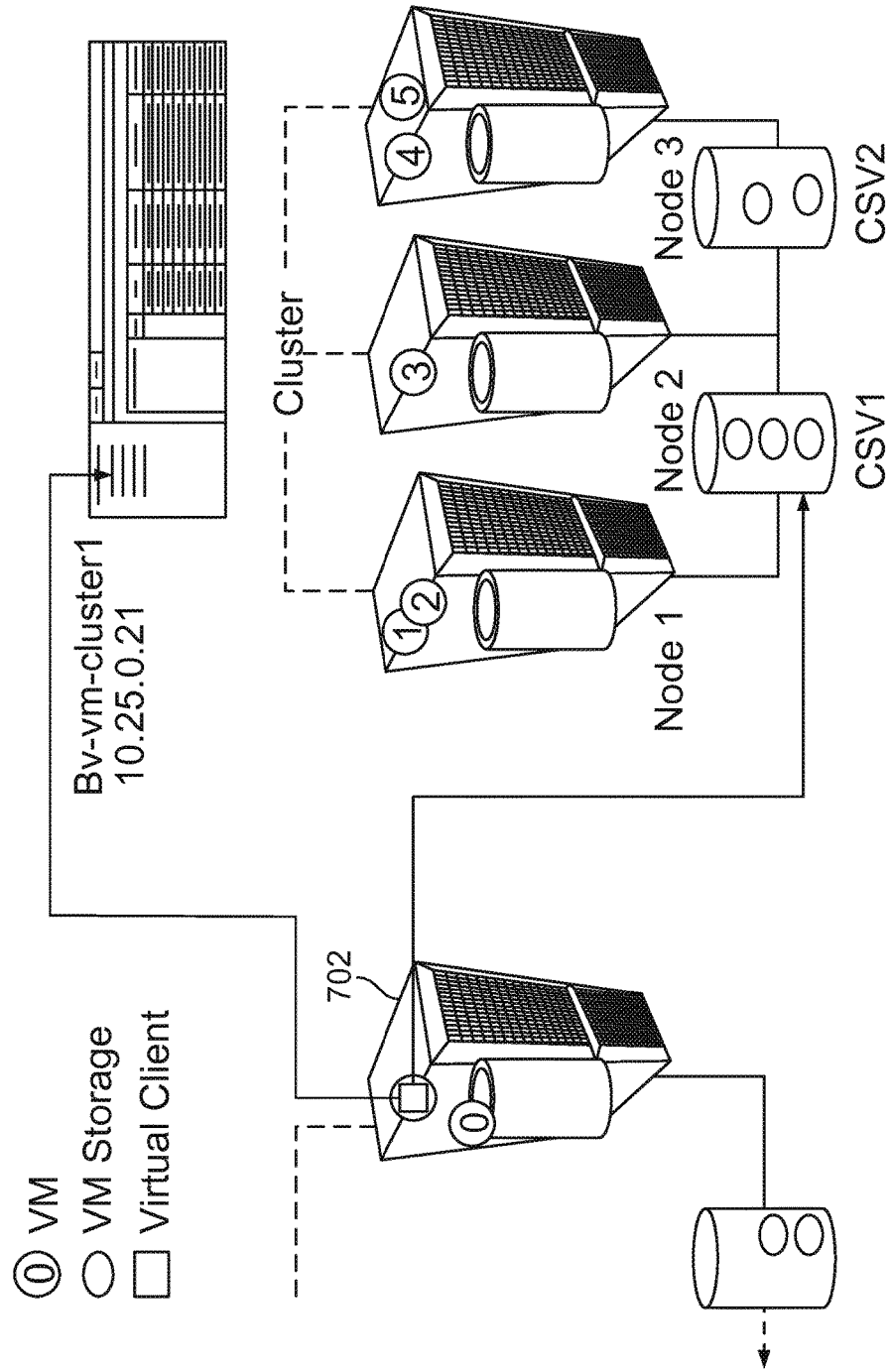
FIG. 7 illustrates the architecture of a solution for a proxy virtual client on a virtual machine by way of example.

FIG. 7 illustrates the architecture of a solution for a proxy virtual client on a virtual machine by way of example.

The Proxy Virtual Client (denoted by a light solid square) may be installed on a VM (denoted by a solid circle around a VM identity number) running on another physical machine 702 which could be a different Windows cluster node. After the VM joins the targeted backup cluster, it may also access the Shared Storage Volumes.

In some embodiments, the one or more differences between the Proxy Virtual Client running on a VM and a Proxy Virtual Client running on a physical Hyper-V cluster node are:

the Proxy backup client is not running on any of the targeted cluster nodes;

there is no need to provision another physical Hyper-V cluster node as a "stand-by";

all VMs are reported by the Cluster Proxy writers; and since the Proxy Virtual Client is running on a VM, the Hyper-V writer is no longer available. The restore operation uses WMI remoting to restore the VMs.

Backup Component Interaction.

Figure 8:
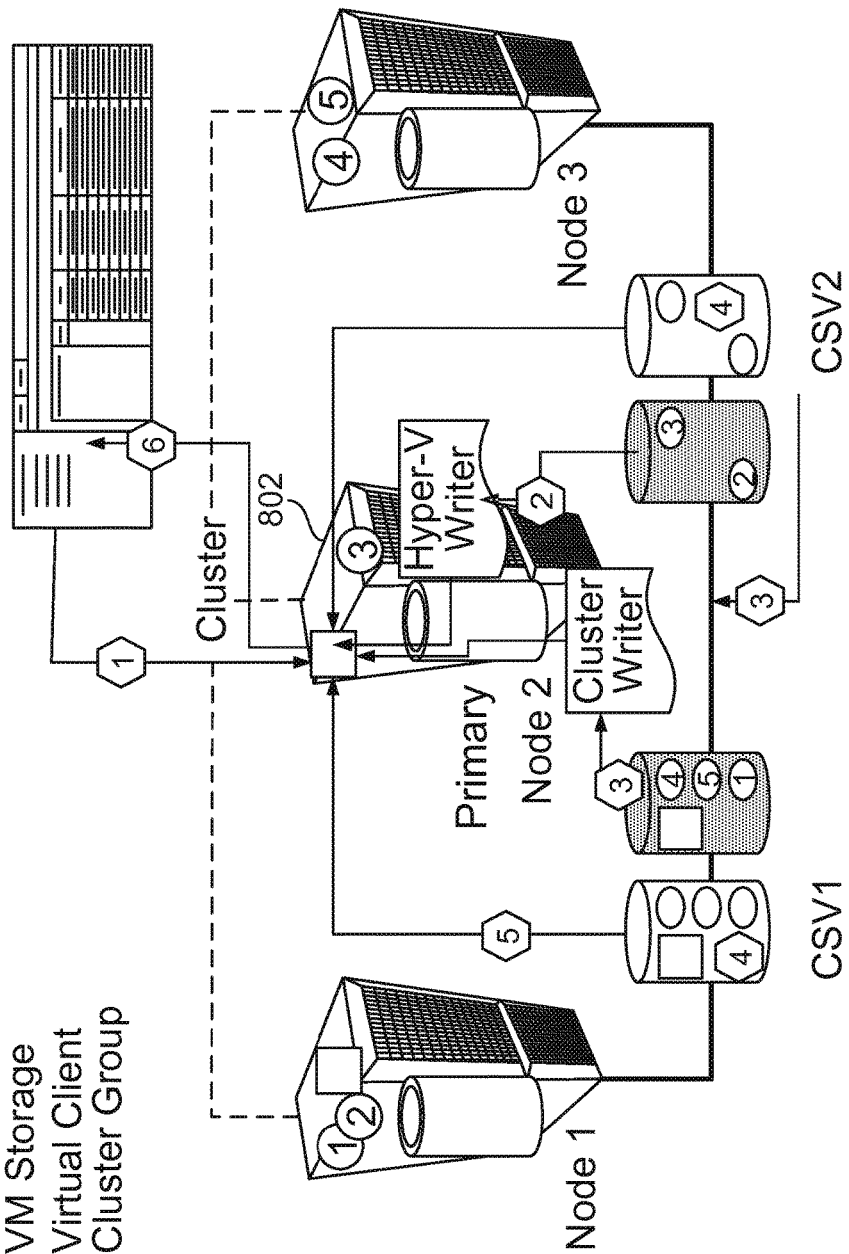
FIG. 8 describes the Cluster Proxy backup operation for the platform of a proxy on a physical node and a proxy on a virtual client.

FIG. 8 describes the Cluster Proxy backup operation for the platform of a proxy on a physical node and a proxy on a virtual client. VMs are denoted by a solid circle around a VM identifier; VM storage is denoted by a solid oval around the corresponding VM identifier associated with the storage; the Virtual Client (Cluster Group) is denoted by a light solid square; the hollow square denotes a provisioned node that can take over from the Virtual Client; and steps are denoted by a step number surrounded by a hexagon. The following is an example of an embodiment.

Step 1. When a backup operation is initiated, the Proxy virtual client Avagent may start the Hyper-V plug-in to handle the backup request. The Hyper-V plug-in may do the following;

Step 2. Sends the request to the Helper Service to perform one or more of the following:

Target CSVs from the targeted VMs in the workorder;

Target the VMs configurations including owner nodes, OS versions and VHD sizes (if possible); and If the workorder requests an incremental backup, the Hyper-V plug-in may request the Helper Service to enable the incremental flag for all targeted VMs;

Step 3. If the Proxy Node 802 is a physical Hyper-V node, the Hyper-V plug-in includes the Hyper-V VSS Writer in addition to the CSV VSS Writer;

Step 4. The Hyper-V plug-in may take a snapshot of targeted CSVs by using the Microsoft CSV Shadow Copy Provider;

Step 5. The Hyper-V plug-in may get the backup components reported by the VSS Cluster Writer for VMs running on remote cluster node and Hyper-V VSS Writer for the VMs running on the local cluster node. In the above example, since the Proxy Virtual Client is running on Node 2 802, VM3 is reported by the Hyper-V VSS Writer. The VSS Cluster Writer reports VM1, 2, 4 and 5 on behalf of Node 1 and Node 3; and Step 6. The Hyper-V plug-in may store the necessary backup components, backup metadata and complete the backup operation.

Restore Component Interaction.

Figure 9:
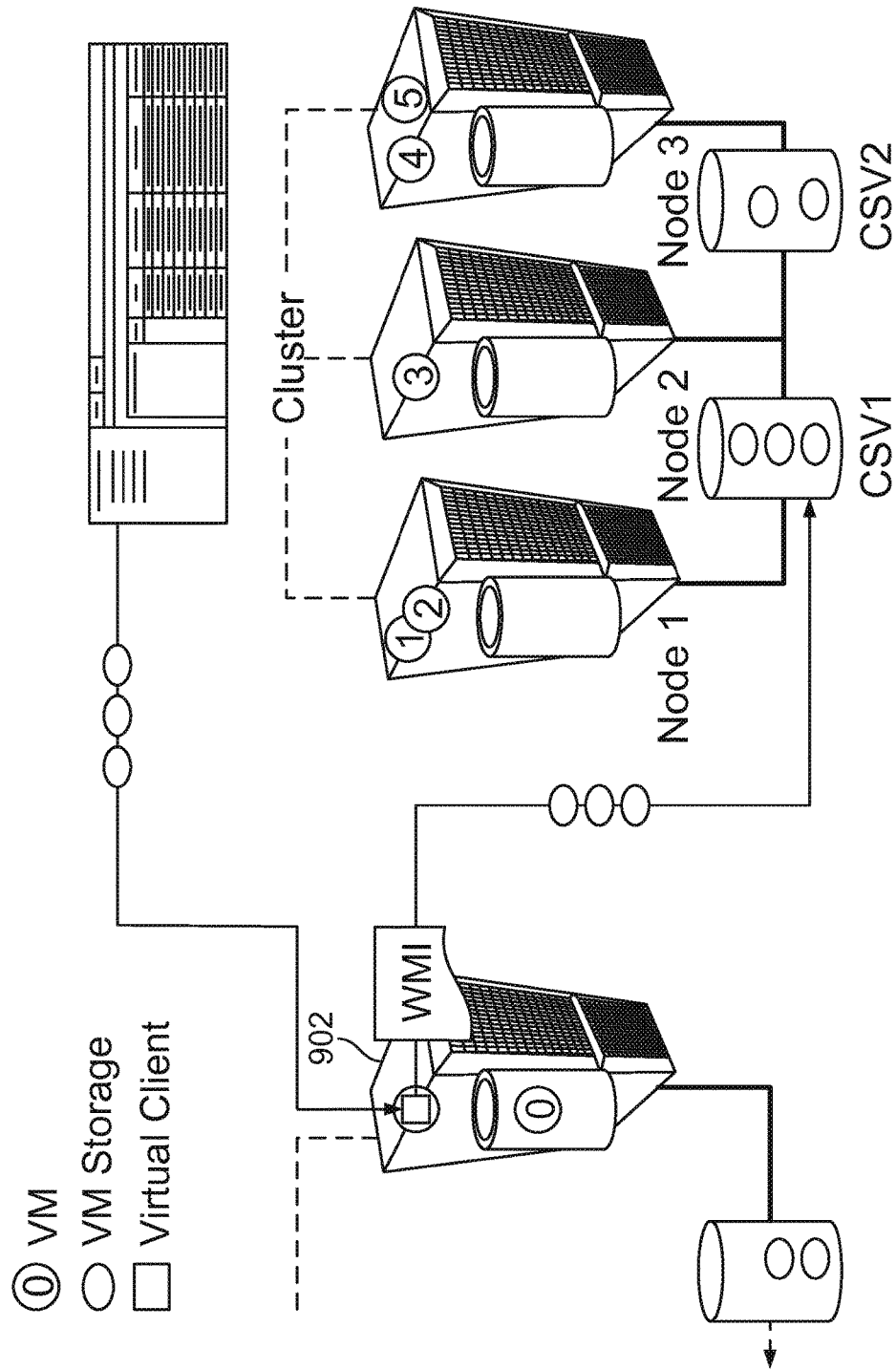
FIG. 9 describes the Proxy VM Virtual Client restore operation.

FIG. 9 describes the Proxy VM Virtual Client restore operation. VMs are denoted by a solid circle around a VM identifier; VM storage is denoted by a solid oval around the corresponding VM identifier associated with the storage; and the Virtual Client (Cluster Group) is denoted by a light solid square. The following is an example of an embodiment.

Step 1. When the restore operation is initiated, the Proxy virtual client Avagent may start the Hyper-V plug-in on the node 902 to handle the backup request. The Hyper-V plug-in may do the following;

Step 2. The Hyper-V plug-in may request Avtar to load the backup Metadata;

Step 3. The Hyper-V plug-in may send the backup Metadata location to the helper service and requests the helper service to perform one or more of the pre-restore operations, including:

The Hyper-V plug-in may use a WMI query along with the original workorder to determine the location for restored VHDs and VM configuration files; and The Hyper-V plug-in may remove the VM if it exists;

Step 4. The Hyper-V plug-in may request Avtar to copy and restore the VMs files to the specified Cluster location;

Step 5. The Hyper-V plug-in may request the Helper service to perform one or more of the post restore operations, including:

adjusting the VM configuration when necessary;

if it is an incremental restore, renaming the backup incremental .aVHDx file to the original name and perform the VHD merge operation;

using a WMI method to bring up the VM in the Hyper-V Manager;

using a WMI APIs to enable the VM as a cluster-wide VM; and migrating to the original node if desired.

Cluster File Server Proxy Virtual Client Architecture.

Windows Server 2012 Cluster File Servers

In addition to the traditional active/passive failover file services offered by the previous versions of Windows, the Microsoft Windows Server 2012 Cluster adds a new file service type called a "Scale-Out" file server. The following table outlines the differences between the "Scale-Out" file server and the "Generic" file server:

| 8220 | Generic File Server | Scale-Out File Server |
| --- | --- | --- |
| Data Accessing Share Volume | Only one active node can access the data Active node - need a disk drive letter Passive node - can use UNC path to access the data | All nodes have equal access All share storage should be under c:\ClusterStorage\<mount point> |
| SMB Share - Basic | Yes | Yes |
| SMB Share - Advanced | No | Yes - with FSRM installed |
| NFS Share - Basic | Yes - - with NFS Server installed | Yes- with NFS Server installed |
| NFS Share - Advanced | No | Yes - with NFS Server and FSRM installed. |
| SMB Share - Scale-Out Application | No | Yes |
| Continuously Available | No | Yes |

Cluster File Server Proxy Virtual Client

The Cluster File Server Proxy plug-in, along with the Cluster Helper Service, may provide the backup and recovery operations for all cluster file servers and their share folders. After the Windows base client and the Cluster Server Proxy is installed, a System administrator may use the Cluster Configuration Tool to provision and configure the Cluster File Proxy Virtual Client in order for it to run properly.

In addition to the plug-in, the Helper service may be used to query and determine the Cluster configuration. The backup and restore operations of the Cluster File Server Proxy may be similar to the Hyper-V Proxy.

Backup Component Interaction.

Figure 10:
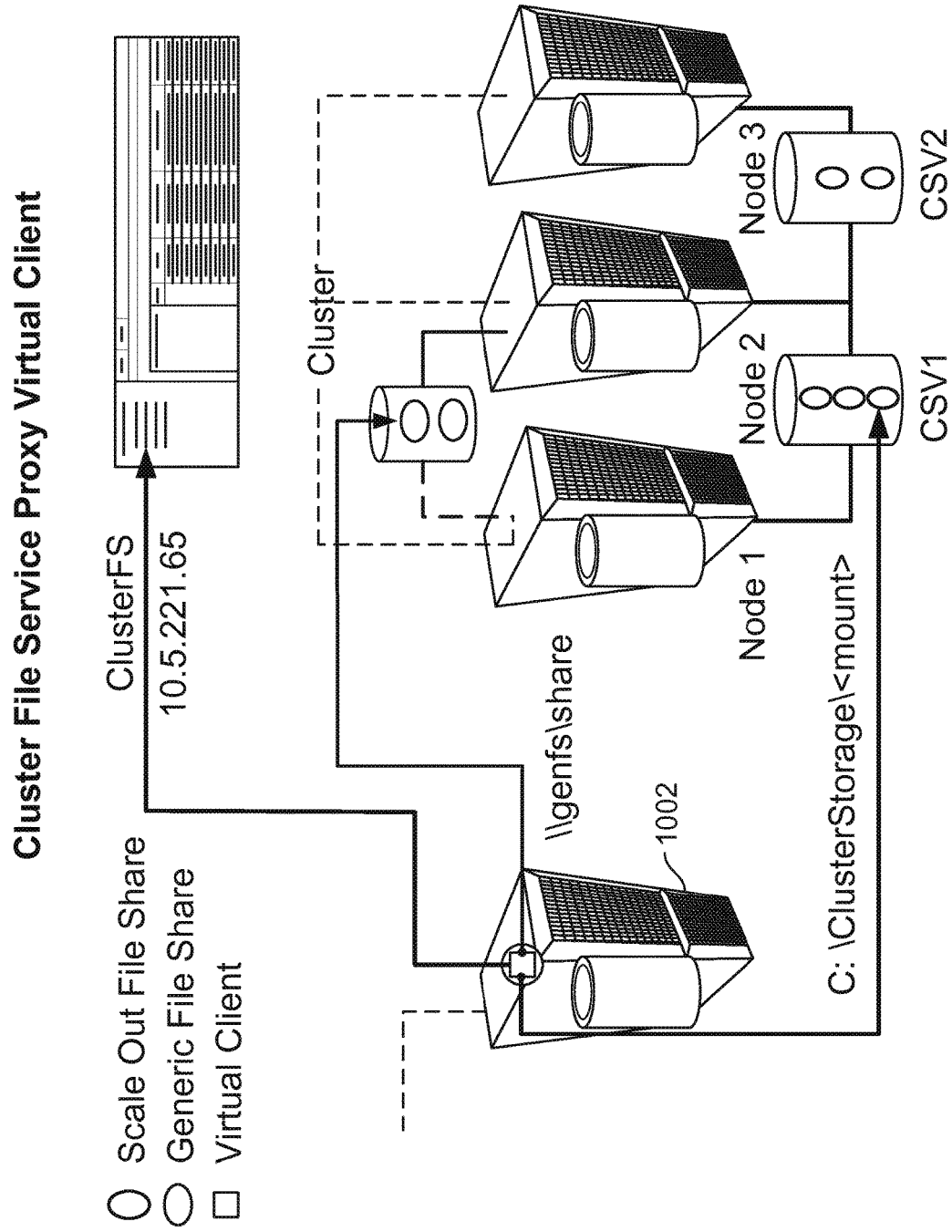
FIG. 10 describes the Cluster File Service Proxy backup operation.

FIG. 10 describes the Cluster File Service Proxy backup operation. Solid dark ovals represent Scale Out file shares; solid light ovals represent generic file shares; and the Virtual Client is denoted by a light solid square. The following is an example of an embodiment.

Step 1. When a backup operation is initiated, the Proxy virtual client Avagent starts the Cluster File Server plug-in to handle the backup request. The Cluster File Server plug-in on node 1002 may do the following to handle the request;

Step 2. The Cluster File Server plug-in may request the Helper service to retrieve targeted file share folders from the targets in the workorder;

Step 3. If the data is served by a "Scale-Out" file server, the Cluster File Server plug-in may take the snapshot by using the Microsoft CSV Shadow Provider;

Step 4. If the data is served by a "generic" file server, the Cluster File Server plug-in may take the snapshot by using the Microsoft File Share Shadow Copy Provider;

Step 5. The Cluster File Server plug-in may request the Avtar to back up the data stored in the specified directory either using the UNC path or C:\ClusterStorage\<Mount Point>" mount point path; and Step 6. The Cluster File Server plug-in may request the Avtar to store the necessary backup metadata and completes the backup operation.

Restore Component Interaction.

The following is an example of an embodiment for restore component interaction.

Step 1. When the restore operation is initiated, the Proxy Avagent starts the Cluster File Server plug-in so it can handle the restore request. The Cluster File Server plug-in may do the following:

Step 2. The Cluster File Server plug-in may request the Helper service to determine the target location. If the target location is a general file server, the Cluster File Server plug-in may request the Avtar to interpret and/or restore the backup data by using the UNC path;

Step 3. If the target location is in a "Scale Out" file server share folder, the Cluster File Server plug-in may interpret and/or restore the backup data directly to the specified "C:\ClusterStorage" mount point; and Step 4. The Cluster File Server plug-in may complete the backup request.

Hyper-V Image Protection Features.

Stand-Alone Hyper-V Image Protection with Local Storage.

The embodiment may comprise features for protecting a stand-alone Windows Server 2012 Hyper-V the same or equal as that supplied by the Windows 2008R2 platform.

Stand-Alone Hyper-V Image Protection with SMB File Share Storage.

In some embodiments, the storage location presents no difference in operating the backup and restore procedures for a VM on a stand-alone Hyper-V server. The same operations protecting local VMs also apply to the VMs on SMB file shares. The user interfaces may be identical to those protecting VMs on local storage. The file share UNC name is shown as the location of the VM VHDx (and avhdx).

Hyper-V Cluster Proxy Backup and Recovery

The Hyper-V Cluster Proxy Virtual Client may be responsible for protecting the VMs on the entire cluster. The procedures for using the Proxy Virtual Client to protect VMs may be the same or similar to those for using the federated client on the Windows 2008 R2 CSV platform. The Avamar console user interfaces for Proxy Virtual Client are described in the following sections.

Backup.

For a Hyper-V Server that is a member of a Hyper-V Cluster, backups for the clustered VMs may be scheduled against the Hyper-V Cluster Proxy Virtual Client name. For example, a customer might use the Virtual Client Name to backup all VMs running on a Hyper-V cluster.

Unlike the federated architecture in Windows 2008 R2, there is no requirement to install an Avamar client on the individual Hyper-V cluster nodes. The Hyper-V Proxy Virtual Client can act just like a stand-alone Hyper-V client. The only difference is that the scope of the protection is cluster-wide.

Restore.

The Hyper-V Cluster Proxy Virtual Client may support all existing restore operations described in the Hyper-V Guide for the Windows 2008R2 platform. Since the Proxy runs on a single node or a VM, a restore operation may not rely on the existence of the VSS framework to conduct the operation.

The Proxy Virtual Client on a VM may use WMI remote management to restore the VM on behalf of the Hyper-V cluster node. Using WMI for restoration should not present any user experience degradation.

Performance.

Since the Proxy Virtual Client backs up the VM image on behalf of all cluster nodes, the "extra hop" to store the backup data may require extra time to complete the operation. On the other hand, unlike conducting a backup operation on the actual physical nodes, a separate node for backup may not degrade any workloads on the Hyper-V Cluster node.

Hyper-V Incremental Backup.

The Hyper-V VSS Plug-in supports incremental backups and recovery from a Full+incremental(s) on Windows Server 2012. The incremental backups and restores are supported for standalone configuration as well as for proxy on a physical node of a cluster. The major advantages of incremental backups are lower network traffic and large reduction of backup time.

To support this feature:

The Hyper-V VSS Plug-in catalog may have a "Backup level" dropdown list added that will contain backup level options, such as "Full" and "Incremental"; and Optionally, a flag may be added to specify that incremental backups should be disabled, allowing only a Full backup (one that cannot be used as a basis for an incremental). Such a flag could require a checkbox in the Plug-in catalog.

Functional Operations.

This section describes Hyper-V plug-in functional operations and its interactions with MSFT VSS framework. The Hyper-V Plug-in may have one or more of the following functional operations, including:

Use a flag, "--brtype" to specify the backup level, of "Full" or "Incremental";

Use a flag, "--enable-incremental" that would specify if incremental type backups are enabled for the client. Default value is disabled;

Promote any Incremental backup to Full when it cannot find a previous Full or incremental for the same saveset;

Promote any Incremental backup to Full when the required Recovery Snapshot cannot be validated;

Add backup metadata containing information such as the backup level, backup prefix, Recovery Snapshot file name, etc. in a file e.g. called HypervMeta.xml under .system_info; and Promote any Incremental backup to Full when it cannot validate the info from the chain_info_file.xml in the previous Incremental of Full to the current state of the VM.

Figure 11:
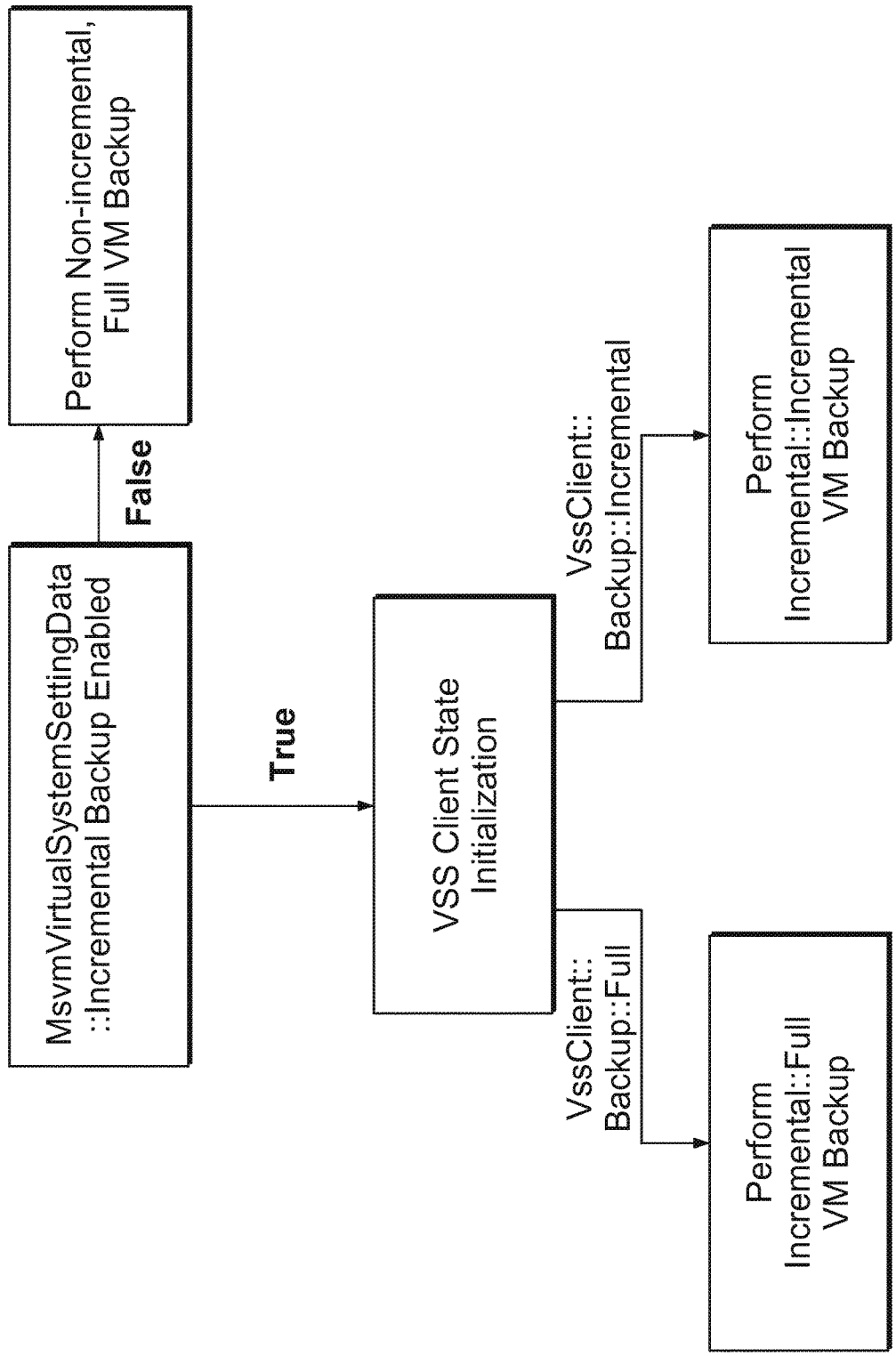
FIG. 11 illustrates a diagram showing possibilities with regards to incremental backup options.

FIG. 11 illustrates a diagram showing possibilities with regards to incremental backup options. In order to be able to perform incremental backup of VMs on Windows Server 2012 a new property 'IncrementalBackupEnabled' of the Msvm VirtualSystemSettingData data type may be introduced in WMI v2. Each VM may be represented by a separate object instance of that type. Setting this property to 'true' may enable incremental-full or incremental-incremental backups of the Virtual Machines depending on the initialized state of VSS framework.

Figure 12:
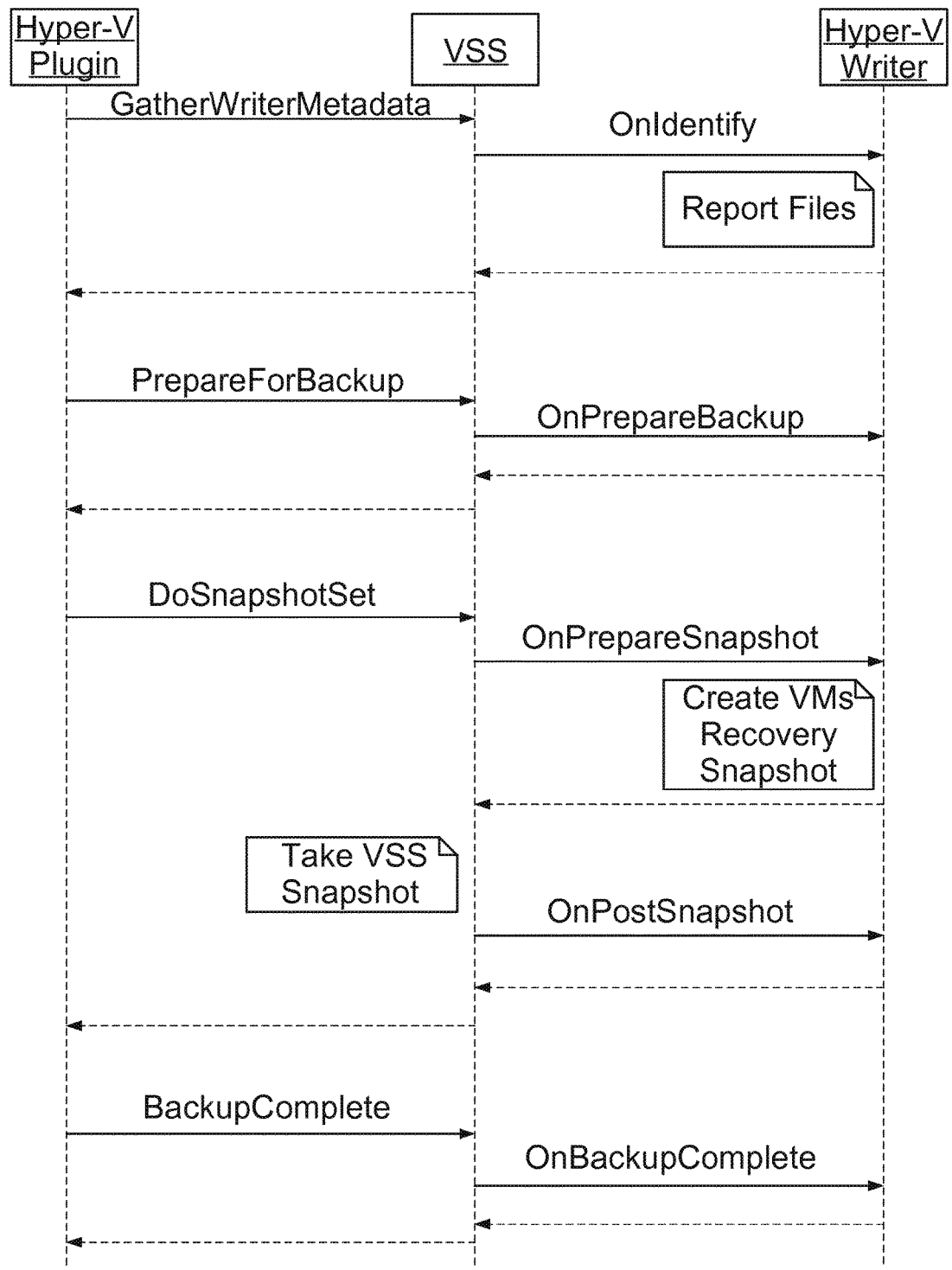
FIG. 12 is a diagram illustrating an incremental backup workflow.

Avamar Hyper-V plug-in may use Hyper-V Writer for backups in standalone configuration. For physical proxy configuration Hyper-V Writer and/or CSV Writer presence on the system may be required. In order to perform the Incremental backup of a VM the following one or more interactions between the plug-in and VSS may take place, including:

Create an instance of VSS client and set its state to VssClient::backup::full or VssClient::backup::incremental Gather writer metadata
Prepare for backup
Create a snapshot set
Save files reported by the writer and the metadata files (Backup Component Document, and Writer Metadata XML).
Complete the backup FIG. 12 is a diagram illustrating an incremental backup workflow. During the Incremental-Full backup the Hyperv-V plug-in may save to the Avamar server one or more of the following files reported by VSS writer, including:

- <VM1_GUID>.xml (VM configuration file)
- - Base.vhdx (Active VHD file before DoSnapshotSet)
- <VM1_GUID>-BackupSnapshot.xml (configuration file for recovery snapshot)
- Base-ChildVhd.avhdx (Active AVHD file after DoSnapshotSet)

During the Incremental-Incremental backup the Hyper-V plug-in may save to Avamar server one or more of the following files reported by VSS writer, including:

- < VM1_GUID>.xml (VM Configuration file)
- <VM1_GUID>.avhdx (Active AVHD file before DoSnapshotSet)
- <VM1_GUID>-BackupSnapshot.xml (configuration file for recovery snapshot)
- <VM1_GUID>-ChildVhd.avhdx (Active AVHD after DoSnapshotSet)

User Interface.

Figures 13A, 13B:
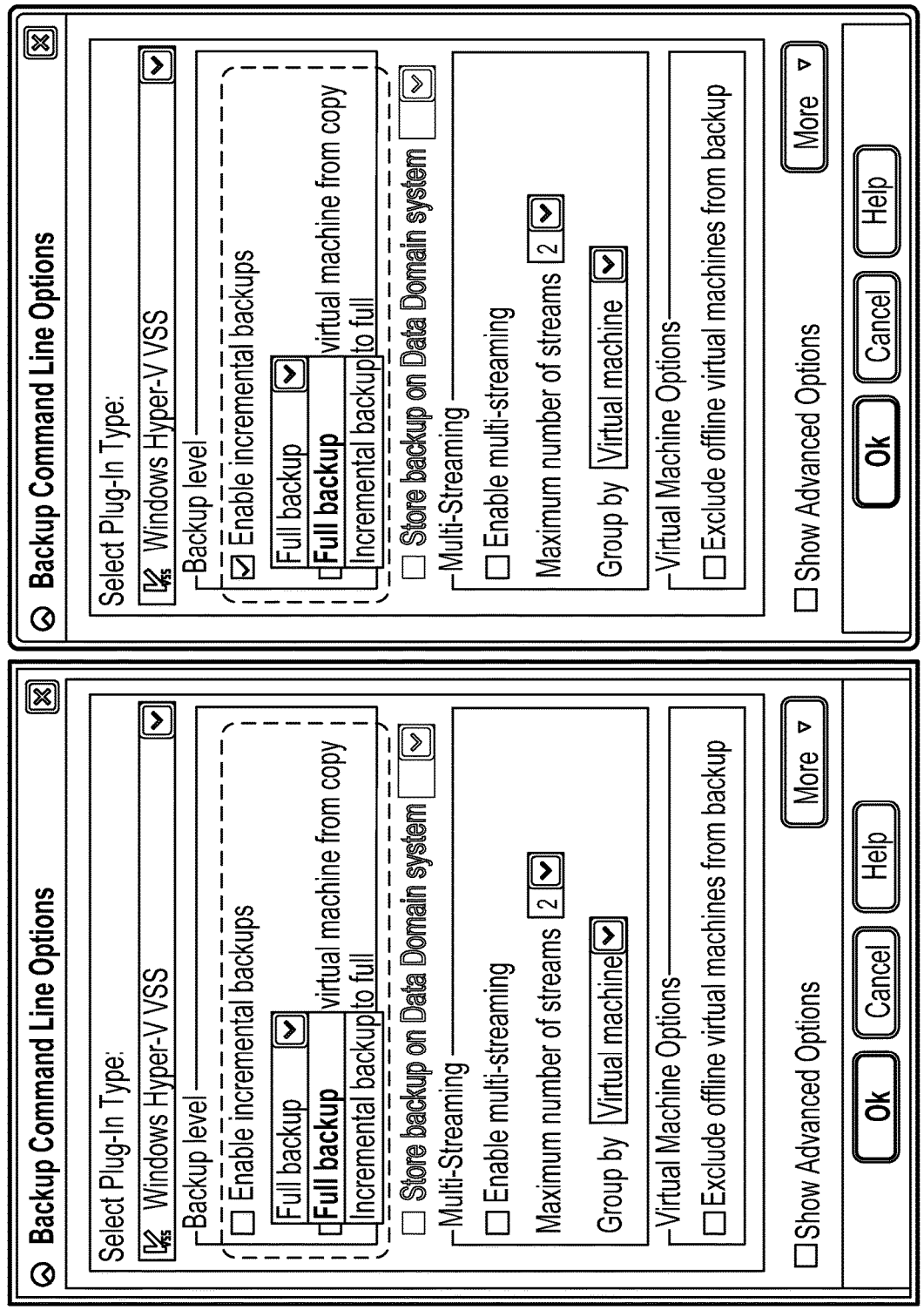
FIGS. 13A and 13B display example user interface windows for backup options.

FIGS. 13A and 13B display example user interface windows for backup options. The Backup Options for the Hyper-V VSS Plug-in may have a new checkbox/drop-down item to indicate the backup level. The checkbox may allow the user to specify whether they want to enable incremental type backups. The drop-down may allow the user to select a backup level of 'Full' or 'Incremental'. If it is unchecked the drop-down showing the available backup levels may be un-selectable.

The default value may have the checkbox disabled which means that incremental backups are disabled by default as shown in FIG. 13A. The user will select the checkbox to enable incremental backups for virtual machines, but must also select the backup type from the drop down as shown in FIG. 13B.

Restore.

During restore operation the Hyper-V plug-in may restore the whole backup chain starting with Full and all subsequent Incremental backups up to and including the selected one. For each restore with exception of the last one of the chain the plug-in may inform VSS that there are additional restore operations coming. This may be done by the SetAdditionalRestores API call.

Figure 14:
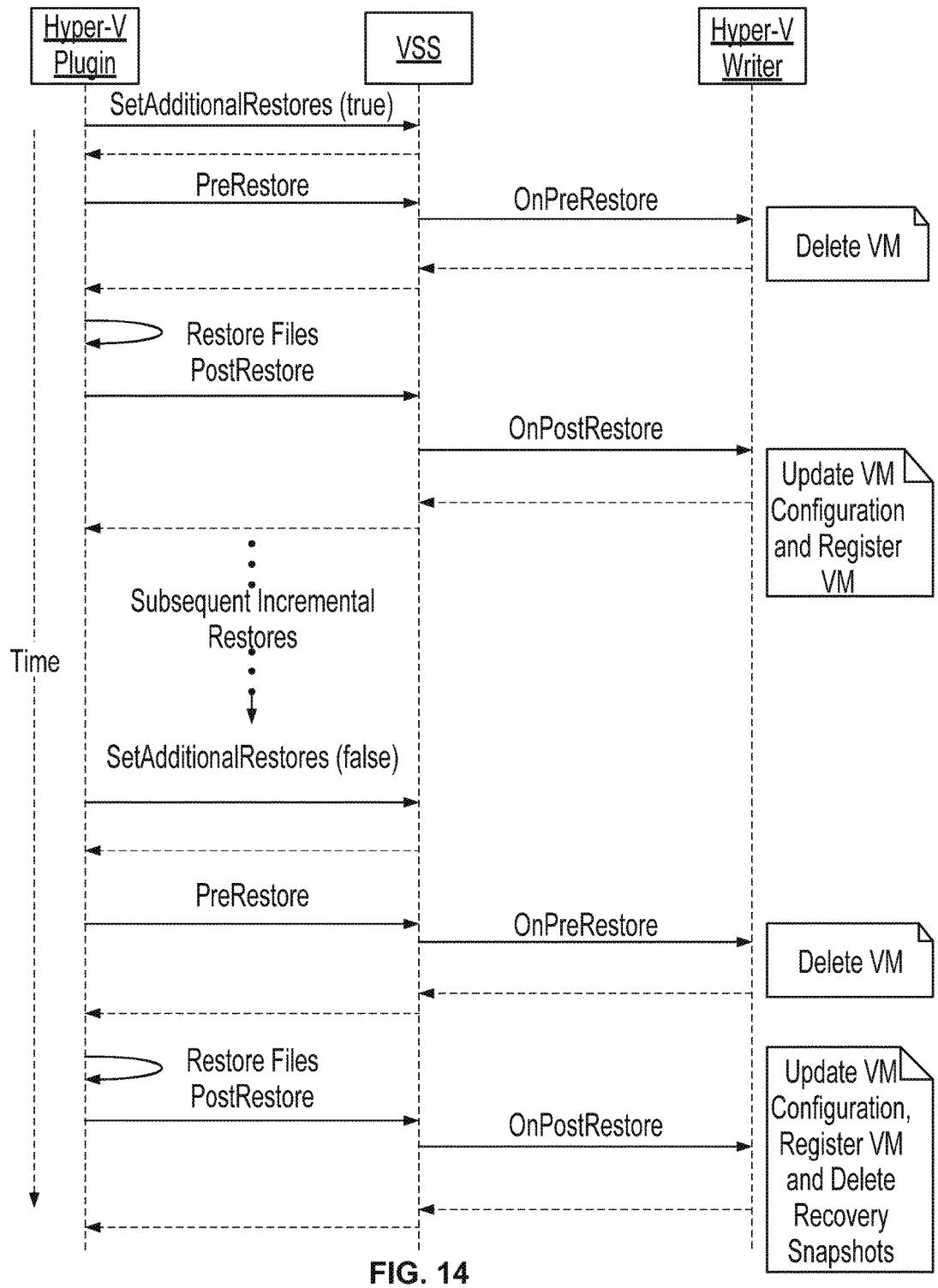
FIG. 14 is diagram illustrating a restore workflow.

FIG. 14 is diagram illustrating a restore workflow. Therefore, if SetAdditionalRestores for a component is set to true, this means that the writer may not execute its recovery mechanism and may expect that additional incremental restores may be done. When the last incremental restore is completed the SetAdditionalResores may be set to false so after the VM is restored the recovery operation is completed and VM is registered with Hyper-V manager. This workflow is illustrated in FIG. 14:

Incremental Backup Policies.

Incremental Policy for a VM does not Support Incremental Level Backup.

This scenario may be equivalent to a scenario wherein an Exchange plug-in cannot perform incremental backup on a DB with circular logging enabled. The Exchange policies in this scenario are described below as a reference:

Radio button flag with three options in the 'More Options' dialog, including:

Promote—Backup All, promote to full
Circular—Only backup circular enabled databases, promote to full
Skip—Skip circular enabled databased, allow incremental An equivalent set of options for Hyper-V are, including:
Promote—Backup all VMs, promote to Non-Incr Full'
Non-Incr—Only backup VMs that do not support incremental backup, promote to 'Non-Incr Full'
Skip—Skip VMs that do not support incremental backup, allow incremental Incremental policy for a VM may be in a saveset set to be at level Incremental, and may not be part of the previous backup, including:

Promote—Backup all VMs, promote to level 'Incr-Full'; or
Skip—Skip VMs not in previous backup The user interface may include a checkbox with appropriate text for administrator to select Performance.

Performing incremental backups may result in smaller backups and shorter backup times. While a new Recovery Snapshot may be created for each VM, each incremental backup may result in only the changes from the previous Full\incremental backup.

I18N.

The proxy may conform to standard Avamar I18N support, wherein non-English user data is protected, but users may use 7-bit ASCII for all commands and selections.

Error Recovery Strategy.

Any errors that occur during a backup or recovery may be displayed in the log file and are descriptive to enable the user to pinpoint what may have gone wrong.

Configuration Support.

No changes to the installation may be required to support this feature.

Hyper-V In-Guest Backup Type Policy.

During the Hyper-V VSS Writer backup workflow, an in-guest shadow copy may be performed for Microsoft Windows OS to ensure the in-guest state may be "application consistent" prior to creating the VM image-level snapshot in the parent.

Prior to Windows Server 2012, the VSS backup level for the in-guest shadow copy may have been always level full. Since the in-guest shadow copy might include application writers, a side effect of the in-guest shadow copy was that application logs might be truncated. This may be true for Exchange, where the full in-guest VSS backup may result in Exchange log truncation.

To enable customers to perform in-guest application backups separately from the parent-level VM image backups, the Windows Server 2012 Hyper-V VSS Writer introduces a new feature that allows selection of the guest "internal" backup type. The backup type that may be specified is VSS backup type full and VSS backup type copy. The VSS full backup type may result in log truncation, for example, for Exchange. However, the VSS copy backup type does not result in log truncation for known application writers such as Exchange.

The Hyper-V Plug-in may choose to expose this capability as a single policy setting for the backup job. The policy may insure that the default in-guest backup type is VSS backup type copy to ensure that application logs are not truncated by default with the VM image backups performed by the Hyper-V Plug-in.

Backup.

The Hyper-V VSS Plug-In may support a new flag—promote-child-copy-to-full. The default value for this flag may be 'false'. For Windows 2012 systems, the value of—promote-child-copy-to-full may be passed to the VSS framework for each virtual machine being backed up. The flag is ignored for Windows 2008 R2 systems.

Figure 15:
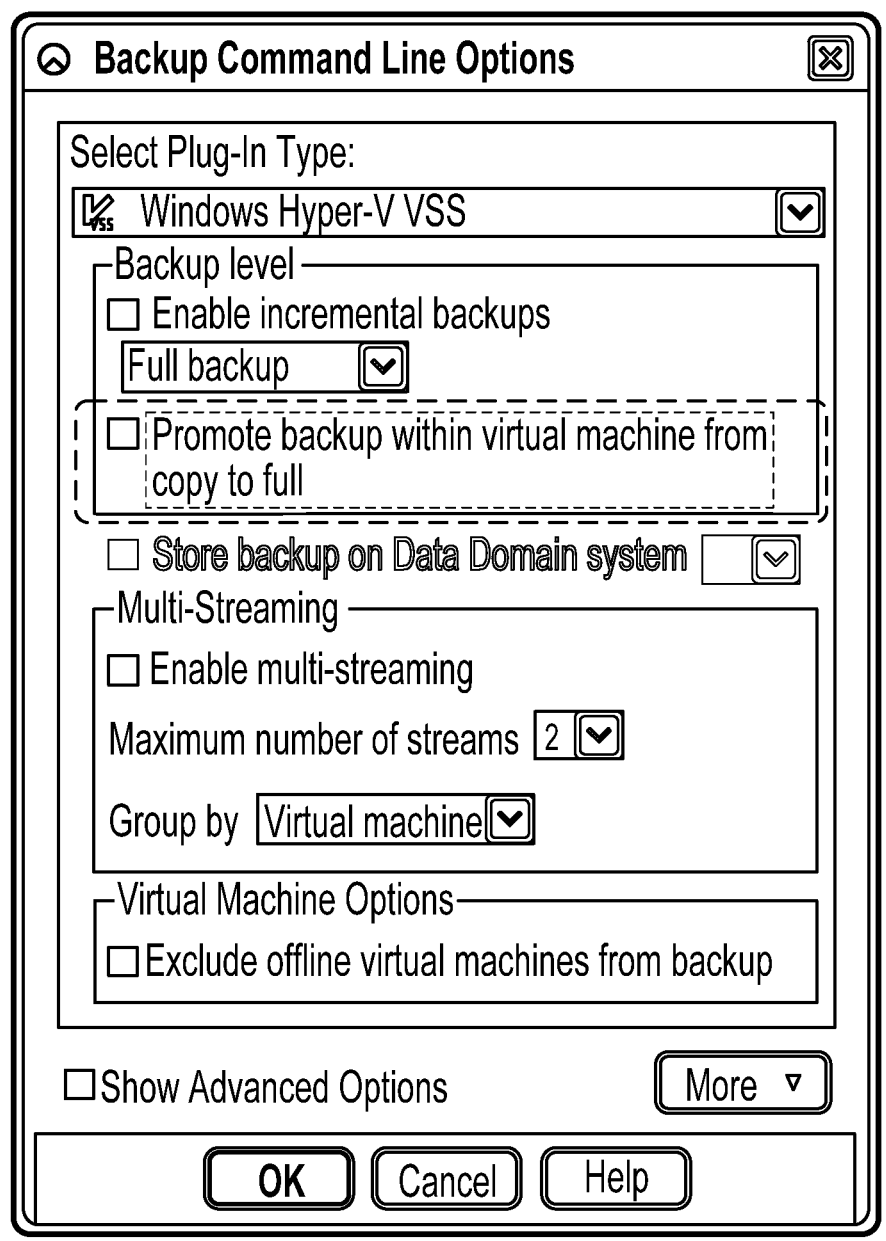
FIG. 15 displays example user interface windows for Windows Hyper-V VSS plug-in options.

FIG. 15 displays example user interface windows for Windows Hyper-V VSS plug-in options. The backup options dialog for Hyper-V VSS Plug-in may add the flag to the "Backup level" control group. The option is unmarked by default. Customers may mark the flag if they want in-guest full backups.

Hyper-V GLR.

The Hyper-V Granular Level Recovery ("GLR") adds a new feature that restores the incremental Hyper-V backup image. The Hyper-V GLR uses a similar workflow to restore the incremental backup image as restoring a VHDx with snapshots.

Hyper-V GLR Timeouts.

The Hyper-V GLR may introduce the ability to specify a GLR Timeout. The GLR timeout may define the amount of the AvFS and associated VM VHDs will remain mounted on the client.

The primary use case for specifying GLR Timeout may be for third party granular recovery of application data from an image backup. For example, customers may have Microsoft Exchange or Microsoft SharePoint running as a Hyper-V virtual machines. A customer may use the Hyper-V GLR feature to mount a virtual machine that is an application server, and then access the application files from the mounted VHDs using a third party tool such as Kroll OnTrack (Microsoft SharePoint) or Kroll PowerControls (Microsoft Exchange).

The Hyper-V GLR timeout may be a persistent value stored in the registry value 'HKLM\Software\EMC\Avamar\AvFS\HyperVGLRBrowseTimeout'. The registry value may not exist by default. The Hyper-V GLR Service may manage the registry key and adds new "set" and "get" methods to its COM interface. The Hyper-V GLR command-line may provide the customer interface for modifying the setting so customers do not have to edit the registry.

Hyper-V GLR Timeout Configuration.

The Hyper-V GLR timeout may be configured prior to GLR mounting on the GLR proxy. A new command-line flag may be introduced for avhypervglr.exe to allow customers to set or modify the timeout. The timeout value may be persisted in the Windows registry and then used by GLR mounting.

The following command may set the GLR timeout to the value <n>, which is in units of minutes. A minimum value of 5 minutes may be specified.

```
avhypervglr -set-glr-timeout=<n>
C:\Program Files\avs\bin>avhypervglr --set-glr-timeout=5
ERROR: Found duplicate flag 'format'
ERROR: Found duplicate flag 'validate'
ERROR: Found duplicate flag 'subprocesstimeoutsecs'
ERROR: Found duplicate flag 'callbackporttimeoutsecs'
ERROR: Found duplicate flag 'snapupbrowsetimeoutsecs'
ERROR: Found duplicate flag 'afterfinalwrapupdelaysecs'
avhypervglr Info <7075>: argc = 2
avhypervglr Info <7076>: argv[0]=avhypervglr
avhypervglr Info <7076>: argv[1]=--set-glr-timeout=5
avhypervglr Error <0000>: Setting GLR browse timeout to '5'
avhypervglr Info <0000>: Hyper-V GLR browse timeout was set to '5'.
```

The command may have no effect on any GLR mount operation that is currently in progress.

The following command may display the current value of the GLR timeout:

Avhypervglr-get-glr-timeout

```
C:\Program Files\avs\bin>avhypervglr --get-glr-timeout
ERROR: Found duplicate flag 'format'
ERROR: Found duplicate flag 'validate'
ERROR: Found duplicate flag 'subprocesstimeoutsecs'
ERROR: Found duplicate flag 'callbackporttimeoutsecs'
ERROR: Found duplicate flag 'snapupbrowsetimeoutsecs'
ERROR: Found duplicate flag 'afterfinalwrapupdelaysecs'
avhypervglr Info <7075>: argc = 2
avhypervglr Info <7076>: argv[0]=avhypervglr
avhypervglr Info <7076>: argv[1]=--get-glr-timeout
avhypervglr Info <0000>: Current Hyper-V GLR browse timeout is '5'.
C:\Program Files\avs\bin>
```

Hyper-V GLR Timeout Workflow.

The GLR workflow for application restore from image backup may be slightly different:

1. On the Hyper-V GLR proxy, customer sets the GLR timeout value using the avhypervglr-set-glr-timeout flag;
2. On any system, Customer uses Avamar Administrator to select the backup and mount the selected virtual machine containing the application data;
3. On Hyper-V GLR proxy, customer runs third party tools, such as Kroll OnTrack, and opens the application files from the mounted VHD. The VHD files for the selected virtual machines are available under the mount points created under C: \Program Files\ays\ . . . ; and 4. If the customer wants to select a different virtual machine or backup, the customer may go to step 2 and repeats the process.

There may be no client-side command to cancel a mount operation on the client.

Hyper-V GLR Timeout Design Rationale.

The Administrator GLR user interface design may not currently provide the ability to specify options (such as a mount timeout) during the GLR mount and browse. In one embodiment the Hyper-V Plug-in adopts the MOSS GLR usability model, wherein an image backup is performed to select the backup and the virtual machine, and then an alternate plug-in is selected prior to the restore. In other embodiments, this usability model is not adopted, and so may utilize the existing Hyper-V GLR browse and mount capabilities.

As a client-side setting, this also has an effect on the GLR Proxy when used to perform a full GLR workflow from an Administrator interface. The full GLR workflow may select the backup, browse and select the virtual machine to mount, and then browse, mark files, and start the restore. The GLR timeout set via the avhypervglr command-line may affect the time the VM remains mounted during the browse. Once the restore is started, the post restore GLR timeout may then be used.

As a client-side setting, once the GLR mount is performed and the third party application attaches to the application files, it may be possible that one may also start a GLR restore from the Administrator interface, which may result in setting the GLR timeout to the post-restore timeout value.

As a client-side setting, once the GLR mount is performed and the third party application attaches to the application files, it is possible that one may select a different backup to mount from the Avamar Administrator, which may result in canceling the current GLR mount.

Alternative Embodiments.

In some embodiments, an installation parameter is added to allow customers to specify the GLR timeout. This embodiment may not be attractive because in order to modify the setting would require re-running installation, and therefore a reboot of the system.

In some embodiments, it is leveraged that the NetWorker Module for Microsoft Applications introduced a system tray icon for MOSS GLR to support extending the timeout of an active mount, or cancel the mount.

Cluster File Server Proxy Virtual Client Product Features.

In some embodiments, the Cluster File Server Proxy Plug-in performs the backup and recovery of all cluster file servers and their share folders. A helper Windows service performs the required cluster configuration or administration functions on behalf of the Proxy plug-in.

The Cluster File Server Proxy may support backup of files and directories in shared folders. The Proxy may allow share folder and file server selections as well as individual files and/or entire directories under the Proxy Virtual Client name.

The Cluster File Server Proxy may leverage the new 'Microsoft CSV Shadow Copy Provider' and 'Microsoft File Share Shadow Copy provider' to take a backup snapshot of remote disk volumes. Therefore, the Proxy client only may need to be installed on one node to perform backup and restore operations for the entire cluster.

Installation.

The Cluster File Server Plug-in product installation may provide installation for the Cluster File Server backup and recovery features. The installation procedure may install the new plug-in binaries, the Proxy Helper Service for backup/recovery and the plug-in PIN file.

Configuration.

The Cluster Configuration Tool may be enhanced to provision and configure the Cluster File Server Proxy Plug-in.

Backup.

The Cluster File Server Proxy Plug-in may support backup of file servers, their share folders and files. A backup administrator may select a) file server(s), b) share folder(s) in a file server; or c) files and folders in a share folder.

Backup View.

Figure 16:
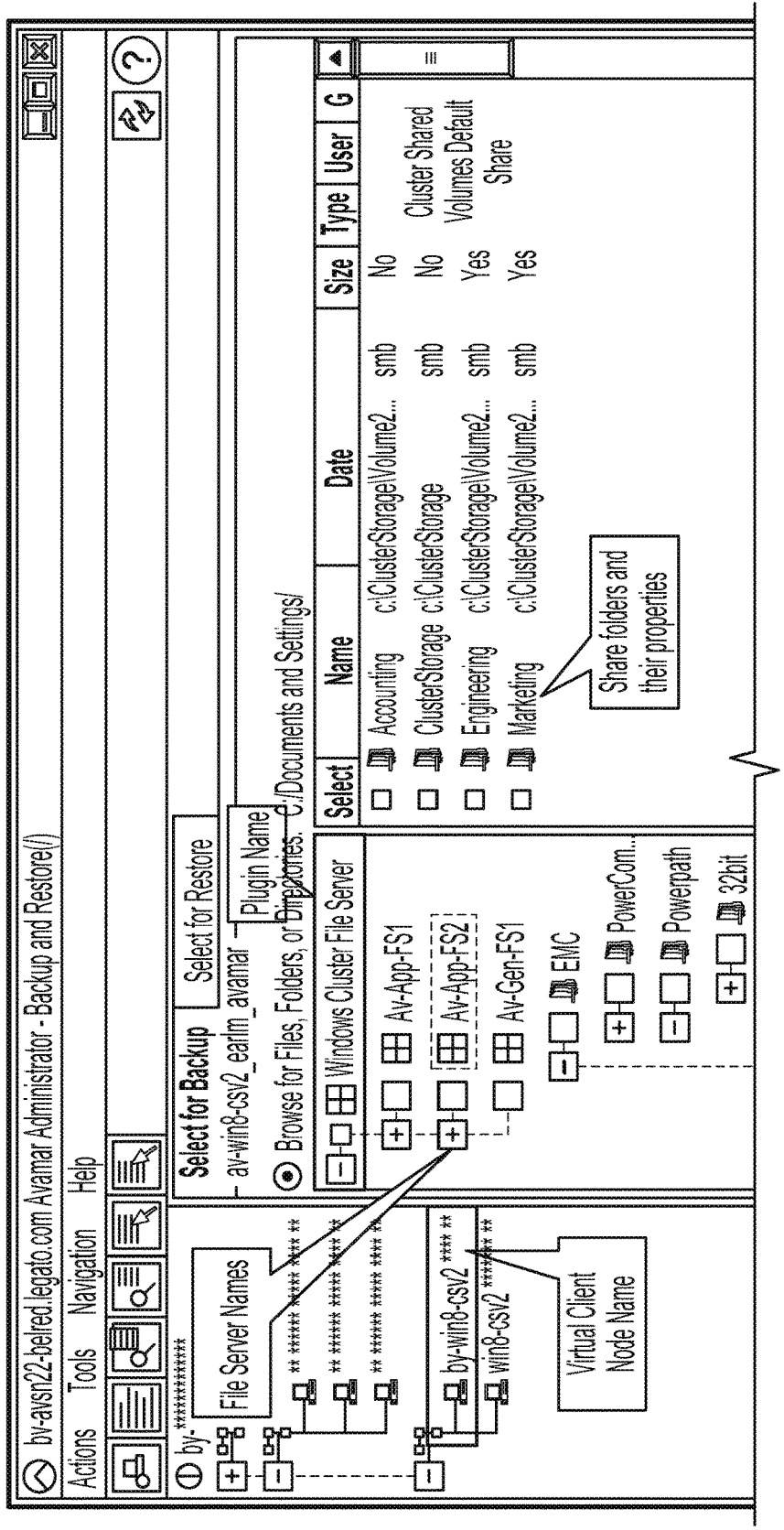
FIG. 16 displays an example user interface window for the Cluster File Server Proxy Plug-in view.

FIG. 16 displays an example user interface window for the Cluster File Server Proxy Plug-in view. The Cluster File Server Proxy Plug-in may support on-demand and scheduled backups. The backups may be scheduled against the Cluster Virtual Client name as indicated in FIG. 16. This is reflected in the two tables below:

| Tree Level | Item | Description |
| --- | --- | --- |
| Root | Cluster Virtual Client Name | The Cluster Virtual Client name (av-win8-csv2.earlm.ava) is registered by the Cluster Configuration Tool when it provisions the Cluster Virtual Client. |
| Second Level | File Server Name(s) | All File Server instances in the cluster. The file server list in the console shows the current file servers in the cluster. It is unnecessary to run an extra Cluster Configuration when a new file server arrives. |
| Third Level | File Share Name(s) | When a Cluster File Server is selected, it expands to show all the share folders under the file server. |
| Fourth Level Etc . . . | Directories and Files | When a Share Folder is expanded, all files and directories are selectable. |

| Item | Column | Description |
| --- | --- | --- |
| Cluster Virtual Client Name | N/A | N/A |
| File Server Name | Name | Name of the file server. |
| | Path | Directory path. |
| | Owner Node | The cluster owner of the file server. |
| | Size | |
| File Share Name(s) | Path | UNC Path. |
| | Size | |
| | ACL | |
| File or Directory (match the standard file system browse view) | Name | |
| | Size | |
| | ACL | |

Backup Operation.

During backup, the Cluster File Server Proxy Plug-in may run on the Proxy node provisioned by the Cluster Configuration. The executable may create a log file in the "var" directory configured by the Cluster Configuration Tool. The Cluster File Server Plug-in may receive a backup workorder from the Avamar Administrator. This workorder may detail what to backup, along with other options.

The backup granularity supported is:

| Backup Graularity | Description |
| --- | --- |
| | The Cluster Virtual Client name (av-win8-csv2.earlm.ava) is registered by the Cluster Configuration Tool when it provisions the Cluster Virtual Client. |
| All | Backup all Cluster File Servers. |
| File Server | Backup the entire file server. |
| File Share | Backup the entire file share within a file server. |
| Files and Directories | Backup the individual files and directories. |

After receiving the backup workorder, the Cluster File Server Proxy Plug-in may perform one or more of the following, including:

Checking the location of the backup targets;

If the backup targets are located on a file share of a "General File Server", wherein the General File Server is exported from a Cluster Failover disk which is an "active" and "stand-by" share disk architecture. There may only be one node (e.g. the owner node) that can access the disk at one time, including one or more of;

Interfacing with WMI and finding out the owner node of the file share disk(s) containing the backup target(s);

If the proxy node is the owner, performing the backup operation just like a local file system. Since the proxy node "owns" the file share disk, it may behave just like a local disk and the File Server Plug-in may use the default System Provider to take the snapshot of the disk volume; and/or If the file share disk is owned by a remote cluster node, the Cluster File Server Proxy virtual client may use the Microsoft File Share Shadow Copy provider to take the snapshot of the file share disk remotely;

If the backup targets are located on a "Scale-out File Server", wherein the Scale-out File Server is a new type of file server in Windows 2012. It operates on CSV volumes. All nodes can access the disk all the time. The "owner node" is simply the "coordinator" of the I/O operations, including one or more of:

Finding out where and which CSV volumes contain the target file(s), or file share(s) and ensure the target(s) are located under the CSV mount points;

Using the 'Microsoft CSV Shadow Copy Provider' to take a snapshot of the targeted CSV volumes; and/or Once the snapshot is taken, the Cluster File Server Proxy may call Avtar to back up the targets and create the final snap-view.

The Cluster File Server Plug-in may use the new -browseoverride file in creating the final snap-view.

Multi-Stream.

Figure 17B:
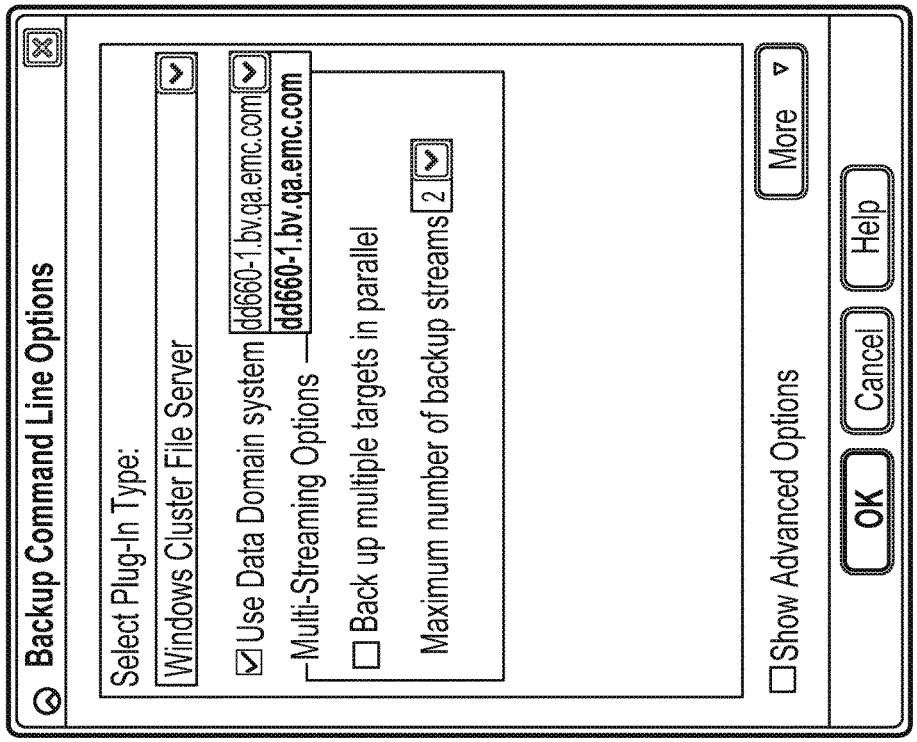
FIGS. 17A and 17B display example user interface windows for the Cluster File Server Proxy Plug-in backup options.
Figure 17A:
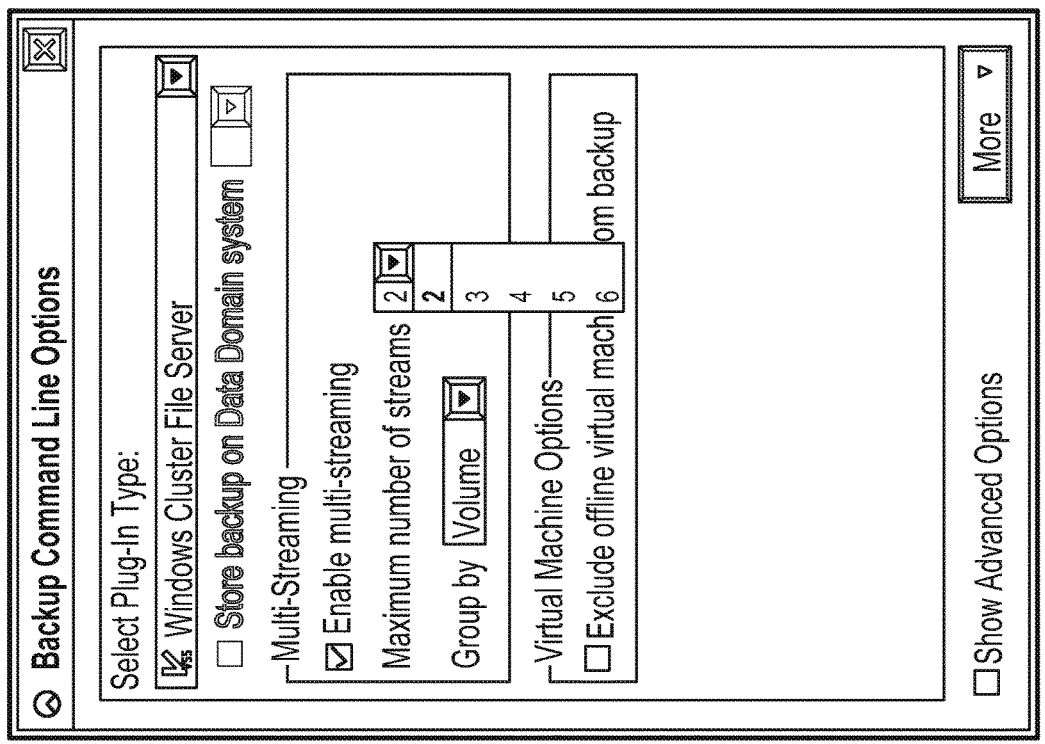

FIGS. 17A and 17B display example user interface windows for the Cluster File Server Proxy Plug-in backup options. The Cluster File Server Plug-in may support multi-stream backup. This option may be configured in the backup options for the plug-in as illustrated in FIG. 17A. The default multi-stream grouping option may be "by File Shares". The multi-stream "by volume" grouping option may work better in some cases. The grouping option may be changed in the advanced options.

DDR.

The Cluster File Server Plug-in may support DDR backup. This option is configured in the backup options for the plug-in as illustrated in FIG. 17B. The Cluster File Server Plug-in will also support DDR Multi-stream and Direct Tape Output ("DTO").

Restore

The Cluster File Server Plug-in supports multiple restore use cases, as illustrated in this table:

| Use Case | Description | File or directory exist? | Share Folder exists? | File Server exists? | Cluster exists? |
| --- | --- | --- | --- | --- | --- |
| Restore to the original location | Restore one or more files or directories to the original location. | N/A | Yes | Yes | Yes |
| Redirected restore to a new share folder | Restore one or more files, directories or share folders to the original file server. | No | No | Yes | Yes |
| Redirected restore to a new file server | Restore one or more files, directories, share folders and file services to the original cluster. | No | No | No | Yes |
| Redirected restore to a new cluster | Restore one or more files, directories, share folders or file servers to a new cluster. | No | No | No | New Cluster |
| File by file restore | Restore files and directories only. No file services or share folders will be restored. | N/A | N/A | N/A | N/A |

Recovery Operations.

FIG. 18 displays an example user interface window for the Cluster File Server Proxy Plug-in recovery operations. FIG. 18 illustrates the recovery view in the Administrator Backup and Restore window. The recovery view may display the File Server, Share folder and the entire directory path that were part of the selected backup. The user may also select one or more file servers (or share folders) for restore and press the "Restore Now" button to initiate the restore.

Because "restore file server" is a destructive operation, the Cluster File Server Proxy Client may force the user to select an overwrite flag during the restore. If the user does not select the "Allow virtual machine overwrite" checkbox, even the restore workorder may be sent to the client and the Cluster File Proxy plug-in may fail the recovery operation. After receiving a restore workorder, The Cluster File Server Proxy may perform one or more of the following, including:

Translate the target destination path and determine the restore target location;

If the target path is on a CSV volume, call Avtar to restore the files/shares with the CSV volume destination path (e.g. c:\ClusterStorage\<volume>);

If the target path is on a failover disk, call Avtar to restore the file/shares with the UNC path (or local disk if the proxy client is running on the owner node); and/or If there is a permission issue with accessing the target path, the Proxy client may spawn an Avtar.exe process with the Helper Service's security token and restores the files. In some embodiments, the Helper service runs on an account specified by the system administrator with the privileges for accessing the required file shares.

Helper Service, for Example Avamar Plug-in Service for Windows

Cluster Administration Credentials.

WMI and PowerShell are two methods to query and administrate Windows Cluster resources. Using WMI or PowerShell to manage Cluster Resources requires certain privileges and access rights described in the security section. Not all cluster nodes have an Avagent and plug-in installed. When a Proxy plug-in instance needs to query or administrate Windows Cluster resources, the Proxy plug-in's execution thread may need to acquire these privileges in order to carry out the required functions.

The Proxy plug-in is also responsible for taking a shadow copy and accessing disk volumes and data; it must run at a high privilege level to perform the backup operation. In such a case, the Avagent runs on a "localsystem" which is the most privileged account on a local host. Running on the "LocalSystem" is a convenient method to perform required backup and recovery operations. In addition, all plug-ins and Avtars spawned by the Avagent are also run on the "Local-System". However, although a "LocalSystem" account possesses all the required privileges on the local machine, the account does not have access rights for a remote machine. Running on "LocalSystem" cannot use WMI to query or administrate the Windows Cluster resources on a remote cluster node.

There are several embodiments to provide the cluster administration on behalf of a Proxy Plug-in, including one or more of:

1. In one embodiment, Avamar Console collects the required credentials and sends the credentials with workorders to perform the operations. Since the network communication channel is encrypted, sending a password may not be an issue. However, every operation requires prompting for the password. This option creates some "user-friendly" issues especially for the manual "browse" and backup operations. This feature is a challenging solution until the Avamar Server Console can safely store the password in its local storage without prompting for operations' passwords;
2. In another embodiment, the Avamar Console collects the user account name and sends the name with the workorders. Upon receiving the workorder, Avagent locates a process running with the user account, retrieves the security token of the account and uses the token to spawn the plug-in. This embodiment has better TCE and passwords are not being passed through the network. However, there is a challenge that a process with the desired cluster administration account will be running when the workorder is received;
3. In another embodiment, the cluster administrator account credentials are saved on the local environment, which requires special care;
4. Finally, in the preferred embodiment, a Avamar Plug-in Service for Windows is run with the desired Cluster Administration credentials. This Windows Service can administrate Cluster resources on behalf of a Proxy plug-in. This option is the "standard" method. For example, glrsvc is the helper for a GLR plug-in. Challenges include a) the addition of an extra component and the complexity of inter-process communications, and b) that the C# service may need to use "Pinvoke" to call the native common library facility.

The Helper service saves development time by being written in C#, a more WMI compatible language. The Helper service is more secure since the desired account credentials for the service will be entered during Cluster Configuration. The credentials will then be saved with the service by a Windows native facility. There is no need to transfer the credentials via the network or take any special care to protect the information. The Helper service has better TCE as the user only needs to enter the credentials once during Cluster Configuration. There is no need to enter the credentials again for any related operations.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
    taking a remote snapshot of a data associated with a node within a cluster of nodes by using a snapshot facility of an operating system;
    wherein:
        the cluster of nodes provides a failover clustering service provided by the operating system for the cluster of nodes; and
        the snapshot facility provided by a standard distribution of the operating system provides a function for a local node to backup data snapshots at a remote node, and
            wherein the standard distribution of the operating system does not provide a function for the local node to recover data snapshots at the remote node;
    recording a set of backup data components;
    translating a target destination path associated with the data by interpreting the remote snapshot with the set of backup data components without needing installation of dedicated backup software;
    determining a restore target location associated with the data by interpreting the remote snapshot with the set of backup data components without needing installation of dedicated backup software; and
    remotely restoring the data by interpreting the remote snapshot with the set of backup data components without needing installation of dedicated backup software, at least in part to determine a target location.

2. The method of claim 1, further comprising provisioning a node proxy from amongst the cluster of nodes to reconstruct.

3. The method of claim 2, wherein the node proxy may be one or more of: a physical node within the cluster of nodes; and a proxy virtual machine on a node within the cluster of nodes.

4. The method of claim 2, wherein the cluster is a Microsoft Windows 8 Cluster.

5. The method of claim 2, wherein the node is a certain node that is not the node proxy.

6. The method of claim 2, wherein the node proxy can backup and restore for any node in the cluster.

7. The method of claim 1, further comprising determining whether the data is served by a Scale Out file server.

8. The method of claim 7, wherein
    the snapshot facility used is a Microsoft Cluster Shared Volume Shadow Provider if the data is served by a Scale Out file server, and wherein
    the snapshot facility used is a Microsoft File Share Shadow Copy Provider if the data is served by a generic file server.

9. The method of claim 1, where in the snapshot facility is configured for a local node to take a snapshot in order to restore the snapshot locally.

10. The method of claim 1, where in the snapshot facility is configured for a local node to take a snapshot of data that the local node is an owner for.

11. The method of claim 1, where in the snapshot is one or more of: a copy-on-write snapshot; and a shadow snapshot.

12. The method of claim 1, further comprising deduplicating the snapshot using a deduplication engine.

13. The method of claim 1, wherein the data comprises one or more of: a file in a file share; and an entire file share.

14. The method of claim 1, further comprising establishing credentials for the node for reconstruction and wherein the set of data components comprises the credentials.

15. The method of claim 14, wherein establishing credentials for the node comprises providing a helper service running with a desired Microsoft Cluster Administration credentials.

16. The method of claim 1, further comprising interfacing with a Microsoft Windows Management Instrumentation ("WMI") management API to determine ownership of the data.

17. The method of claim 16, further comprising provisioning a node proxy from amongst the cluster of nodes to reconstruct, and wherein:
   the snapshot facility used is a Microsoft CSV Shadow Copy Provider if the data is served by a Scale Out file server;
   the snapshot facility used is a local file system backup if the node proxy is an owner of the data and the data is served by a generic server; and
   the snapshot facility used is a Microsoft File Share Shadow Copy Provider if the node proxy is not an owner of the data and the data is served by a generic file server.

18. The method of claim 1, wherein the node does not have one or more of: a restore agent; a backup client; and dedicated backup software.

19. A system, comprising:
   a processor configured to:
   take a remote snapshot of a data associated with a node within a cluster of nodes by using a snapshot facility of an operating system;
   wherein:
      the cluster of nodes provides a failover clustering service provided by the operating system for the cluster of nodes; and
      the snapshot facility provided by a standard distribution of the operating system provides a function for a local node to backup data snapshots at a remote node, wherein the standard distribution of the operating system does not provide a function for the local node to recover data snapshots at the remote node;
   record a set of backup data components;
   translate a target destination path associated with the data by interpreting the remote snapshot with the set of backup data components without needing installation of dedicated backup software;
   determine a restore target location associated with the data by interpreting the remote snapshot with the set of backup data components without needing installation of dedicated backup software;
   remotely restore the data by interpreting the remote snapshot with the set of backup data components without needing installation of dedicated backup software, at least in part to determine a target location; and
   a memory coupled to the processor and configured to provide the processor with instructions.

20. A computer program product, the computer program product being embodied in a non-transitory computer readable storage medium and comprising computer instructions for:
   taking a remote snapshot of a data associated with a node within a cluster of nodes by using a snapshot facility of an operating system;
   wherein:
      the cluster of nodes provides a failover clustering service provided by the operating system for the cluster of nodes; and
      the snapshot facility provided by a standard distribution of the operating system provides a function for a local node to backup data snapshots at a remote node, wherein the standard distribution of the operating system does not provide a function for the local node to recover data snapshots at the remote node;
   recording a set of backup data components;
   translating a target destination path associated with the data by interpreting the remote snapshot with the set of backup data components without needing installation of dedicated backup software;
   determining a restore target location associated with the data by interpreting the remote snapshot with the set of backup data components without needing installation of dedicated backup software; and
   remotely restoring the data by interpreting the remote snapshot with the set of backup data components without needing installation of dedicated backup software, at least in part to determine a target location.

* * * * *

UNITED STATES PATENT AND TRADEMARK OFFICE
CERTIFICATE OF CORRECTION

PATENT NO. : 10,331,525 B2
APPLICATION NO. : 14/919039
DATED : June 25, 2019
INVENTOR(S) : Earl et al.

Page 1 of 1

It is certified that error appears in the above-identified patent and that said Letters Patent is hereby corrected as shown below:

In the Specification

In Column 18, Line 45, delete "Non-Incr Full'" and insert --'Non-Incr Full'--, therefor.
In Column 21, Line 3, delete "ays" and insert --avs--, therefor.

Signed and Sealed this
Nineteenth Day of May, 2020

Andrei Iancu
*Director of the United States Patent and Trademark Office*